US010345881B2

(12) United States Patent
Muthukaruppan et al.

(10) Patent No.: US 10,345,881 B2
(45) Date of Patent: Jul. 9, 2019

(54) MULTIPLE VOLTAGE IDENTIFICATION (VID) POWER ARCHITECTURE, A DIGITAL SYNTHESIZABLE LOW DROPOUT REGULATOR, AND APPARATUS FOR IMPROVING RELIABILITY OF POWER GATES

(71) Applicant: Intel Corporation, Santa Clara, CA (US)

(72) Inventors: Ramnarayanan Muthukaruppan, Bangalore (IN); Harish K. Krishnamurthy, Hillsboro, OR (US); Mohit Verma, Bangalore (IN); Pradipta Patra, Bangalore (IN); Uday Bhaskar Kadali, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 148 days.

(21) Appl. No.: 15/653,764

(22) Filed: Jul. 19, 2017

(65) Prior Publication Data
US 2017/0315601 A1 Nov. 2, 2017

Related U.S. Application Data

(62) Division of application No. 13/758,897, filed on Feb. 4, 2013, now Pat. No. 9,766,678.

(51) Int. Cl.
*G06F 9/00* (2006.01)
*G06F 1/32* (2019.01)
(Continued)

(52) U.S. Cl.
CPC ............... *G06F 1/32* (2013.01); *G06F 1/324* (2013.01); *G06F 1/3243* (2013.01);
(Continued)

(58) Field of Classification Search
CPC .......... G06F 1/32; G06F 1/324; G06F 1/3243; G06F 1/3296; Y02D 10/152; Y02D 10/172
(Continued)

(56) References Cited

U.S. PATENT DOCUMENTS 622,943 A1 5/2001 Roesner
6,317,069 B1 11/2001 Male et al.
(Continued)

FOREIGN PATENT DOCUMENTS

CN 101233475 7/2008
TW 508542 11/2002
(Continued)

OTHER PUBLICATIONS

Advisory Action, dated Nov. 16, 2016, for U.S. Appl. No. 13/758,897.
(Continued)

*Primary Examiner* — Aurel Prifti
(74) *Attorney, Agent, or Firm* — Green, Howard & Mughal LLP

(57) ABSTRACT

Described is an apparatus comprising: first and second processing cores; and a PCU which is operable to: generate a first VID for an off-die regulator external to the apparatus, the first VID resulting in a first power supply for the first processing core; and generate a second VID different from the first VID, the second VID resulting in a second power supply for the second processing core. Described is an apparatus comprising: a plurality of power-gate transistors controllable by a digital bus, the plurality of power-gate transistors operable to provide a first power supply to a processing core, and to receive a second power supply as input; an ADC to receive the first power supply and to generate a digital output representative of the first power supply; and a controller to receive the digital output repre-
(Continued)

sentative and to generate the digital bus for controlling the plurality of power-gate transistors.

20 Claims, 12 Drawing Sheets

(51) Int. Cl.
  *G06F 1/3234* (2019.01)
  *G06F 1/3296* (2019.01)
  *G06F 1/324* (2019.01)

(52) U.S. Cl.
  CPC .......... *G06F 1/3296* (2013.01); *Y02D 10/152* (2018.01); *Y02D 10/172* (2018.01)

(58) Field of Classification Search
  USPC .......... 713/322, 340, 300; 1/1; 323/350, 274
  See application file for complete search history.

(56) References Cited

U.S. PATENT DOCUMENTS

| | | | |
|---|---|---|---|
| 7,131,089 B2* | 10/2006 | Issa | G06F 17/5031 |
| | | | 716/108 |
| 7,760,011 B2* | 7/2010 | Wang | G06F 17/5045 |
| | | | 326/31 |
| 7,948,422 B2 | 5/2011 | Chiu | |
| 8,635,470 B1 | 1/2014 | Kraipak | |
| 8,990,591 B2 | 3/2015 | Zuo | |
| 9,823,719 B2* | 11/2017 | Jahagirdar | G06F 1/26 |
| 9,904,752 B2* | 2/2018 | Lee | G06F 17/505 |
| 2004/0064747 A1 | 4/2004 | Haider | |
| 2004/0201550 A1 | 10/2004 | Nakamura | |
| 2005/0040800 A1 | 2/2005 | Sutardja | |
| 2005/0232010 A1 | 10/2005 | Cernea | |
| 2006/0026447 A1 | 2/2006 | Naveh et al. | |
| 2006/0220592 A1 | 10/2006 | Barrenscheen | |
| 2006/0282692 A1 | 12/2006 | Oh | |
| 2007/0033425 A1 | 2/2007 | Clark | |
| 2007/0192638 A1 | 8/2007 | Grasso | |
| 2007/0250219 A1 | 10/2007 | Gaskins et al. | |
| 2008/0082844 A1 | 4/2008 | Ghiasi et al. | |
| 2008/0273391 A1 | 11/2008 | Steedman | |
| 2009/0049314 A1 | 2/2009 | Taha et al. | |
| 2009/0066303 A1 | 3/2009 | Smith | |
| 2009/0085552 A1* | 4/2009 | Franza | G06F 1/26 |
| | | | 323/350 |
| 2009/0116307 A1 | 5/2009 | Cottier et al. | |
| 2009/0249092 A1 | 10/2009 | Lam et al. | |
| 2010/0095137 A1 | 4/2010 | Bieswanger et al. | |
| 2010/0123515 A1 | 5/2010 | Sasaki | |
| 2010/0149002 A1 | 6/2010 | Chiu | |
| 2010/0153755 A1 | 6/2010 | Chiu | |
| 2010/0162256 A1 | 6/2010 | Branover et al. | |
| 2010/0250998 A1 | 9/2010 | Herdrich et al. | |
| 2011/0004774 A1 | 1/2011 | Hansquine | |
| 2011/0018523 A1* | 1/2011 | Priel | G01R 19/0092 |
| | | | 324/76.11 |
| 2011/0075491 A1 | 3/2011 | Yun et al. | |
| 2011/0161683 A1* | 6/2011 | Zou | G06F 1/3203 |
| | | | 713/300 |
| 2011/0228622 A1 | 9/2011 | Coteus et al. | |
| 2011/0265090 A1* | 10/2011 | Moyer | G06F 1/3203 |
| | | | 718/103 |
| 2011/0289335 A1* | 11/2011 | Lipiansky | G06F 1/26 |
| | | | 713/340 |
| 2012/0054519 A1 | 3/2012 | Branover et al. | |
| 2012/0079290 A1 | 3/2012 | Kumar et al. | |
| 2012/0153913 A1 | 6/2012 | Wan et al. | |
| 2012/0297232 A1 | 11/2012 | Bircher | |
| 2013/0275782 A1 | 10/2013 | Svilan | |
| 2013/0300386 A1* | 11/2013 | Priel | G11C 5/147 |
| | | | 323/274 |
| 2013/0321071 A1 | 12/2013 | Pietri et al. | |
| 2013/0346816 A1* | 12/2013 | Menon | G01R 31/318572 |
| | | | 714/727 |
| 2014/0002041 A1 | 1/2014 | Soenen et al. | |
| 2014/0189225 A1 | 7/2014 | Conrad | |
| 2014/0195828 A1 | 7/2014 | Varma et al. | |
| 2014/0201550 A1* | 7/2014 | Rusu | G06F 1/324 |
| | | | 713/322 |
| 2014/0208141 A1 | 7/2014 | Bhandaru et al. | |
| 2015/0149794 A1* | 5/2015 | Zelikson | G06F 1/26 |
| | | | 713/300 |

FOREIGN PATENT DOCUMENTS

| | | |
|---|---|---|
| TW | 201227203 | 7/2012 |
| TW | I375915 | 11/2012 |
| TW | I380162 | 12/2012 |
| WO | 0201890 | 1/2002 |
| WO | 2012104673 | 8/2012 |

OTHER PUBLICATIONS

Corrected Notice of Allowability for U.S. Appl. No. 13/758,897, dated Aug. 18, 2017.
Corrected Notice of Allowability for U.S. Appl. No. 13/758,897, dated Jun. 5, 2017.
Decision of Rejection for Taiwan Patent Application No. 105102032, dated Apr. 6, 2017.
Divisional Notification Office Action for Chinese Patent Application No. 201410148759.4, dated Apr. 29, 2016, no translation available.
English Translation of Office Action and Search Report for Taiwan Patent Application No. 103102125 dated Jul. 30, 2015.
English Translation of Office Action for German Patent Application No. 102014001268.9 dated Nov. 9, 2015.
Final Office Action for U.S. Appl. No. 13/758,897, dated Aug. 12, 2016.
Final Office Action for U.S. Appl. No. 13/758,897, dated Oct. 19, 2015.
Non-Final Office Action for U.S. Appl. No. 13/758,897, dated Jun. 4, 2013.
Non-Final Office Action for U.S. Appl. No. 13/758,897, dated Mar. 17, 2016.
Notice of Allowance for Taiwan Patent Application No. 105135734, dated Jul. 20, 2017.
Notice of Allowance issued for U.S. Appl. No. 13/758,897, dated May 11, 2017.
Notice of Grant, dated Dec. 21, 2015, for Taiwan Patent Application No. 103102125.
Notification of Transmittal of the International Search Report and the Written Opinion of the International Searching Authority issued for International Patent Application No. PCT/US2012/071714, dated Sep. 12, 2013.
Office Action and Search Report dated Feb. 21, 2017 for Taiwan Patent Application No. 105135734.
Office Action dated Apr. 1, 2017, for CN Patent Application No. 201410148759.4.
Office Action dated Aug. 2, 2016, for CN Patent Application No. 201410148759.4.
Office Action, and Search Report, dated Oct. 17, 2016, for Taiwanese Patent Application No. 105102032.
Translation of Office Action for German Patent Application No. 10-2014-001268.9, dated Mar. 31, 2016.
Garcia, Jose C. et al., "High Preformance Bootstrapped CMOS Low to High-Swing Level-Converter for On-Chip Interconnects", 18th European Conference on Circuit Theory and Design, pp. 795-798, 2007.
Shrivastava, Aatmesh et al., "A Change Pump Based Receiver Circuit for Voltage Scaled Interconnect", International Symposium on Low Power Electronics and Design, pp. 327-332, 2012.
Zhang, Hui et al., "Low-Swing on-Chip Signaling Techniques: Effectiveness and Robustness", IEEE Transaction on Very Large Scale Integration (VLSI Systems, vol. 8, No. 3, pp. 264-272, Jun. 2000.

(56) References Cited

OTHER PUBLICATIONS

Notice of Allowance for Taiwan Patent Application No. 105102032, dated Jan. 19, 2018.
Office Action dated Nov. 1, 2017, for CN Patent Application No. 201410148759.4.
Non-Final Office Action for U.S. Appl. No. 15/292,067, dated Apr. 5, 2018.
Notice of Allowance for Chinese Patent Application No. 201410148759.4, dated Apr. 24, 2018.
Corrected Notice of Allowance dated Oct. 5, 2018 for U.S. Appl. No. 15/292,067.
Notice of Allowance dated Sep. 10, 2018 for U.S. Appl. No. 15/292,067.
Decision of Grant dated Aug. 18, 2016 for German Patent Application No. 102014001268.9. No translation.
Restriction Requirement dated Feb. 26, 2015 for U.S. Appl. No. 13/758,897.

\* cited by examiner

MULTIPLE VOLTAGE IDENTIFICATION (VID) POWER ARCHITECTURE, A DIGITAL SYNTHESIZABLE LOW DROPOUT REGULATOR, AND APPARATUS FOR IMPROVING RELIABILITY OF POWER GATES

CLAIM FOR PRIORITY

This application is a divisional of and claims priority to U.S. patent application Ser. No. 13/758,897, filed on 4 Feb. 2013, entitled "A MULTIPLE VOLTAGE IDENTIFICATION (VID) POWER ARCHITECTURE, A DIGITAL SYNTHESIZABLE LOW DROPOUT REGULATOR, AND APPARATUS FOR IMPROVING RELIABILITY OF POWER GATES," and which is incorporated by reference in entirety.

BACKGROUND

Existing low dropout (LDO) regulator architecture uses analog voltage to control the gate drive to the LDO. Generating the analog voltage may require careful design of the circuit generating the analog circuit. Generally such circuits do not scale well with process technologies. To regulate the output voltage of the LDO, head room (e.g., of about 50 mV to 100 mV) may be required between the input power supply voltage and the output voltage of the LDO. With respect to the analog LDO approach, there are many challenges.

For example, stability of the feedback loop of the analog LDO may be extremely dependent on package parasitic and the output pole. As a result, to gain stability of the feedback loop a penalty in bandwidth may be made. The analog LDO may also exhibit a minimum dropout at its output node (e.g., 50 mV to 100 mV) for LDO normal operation. When input power supplies are getting lower, such minimum dropout becomes a challenge. The analog LDO may also exhibit a finite direct-current (DC) offset error due to gain limitations that affect the DC set point accuracy. There are also multiple integration and design challenges in analog designs, especially those that use dual loop architecture.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
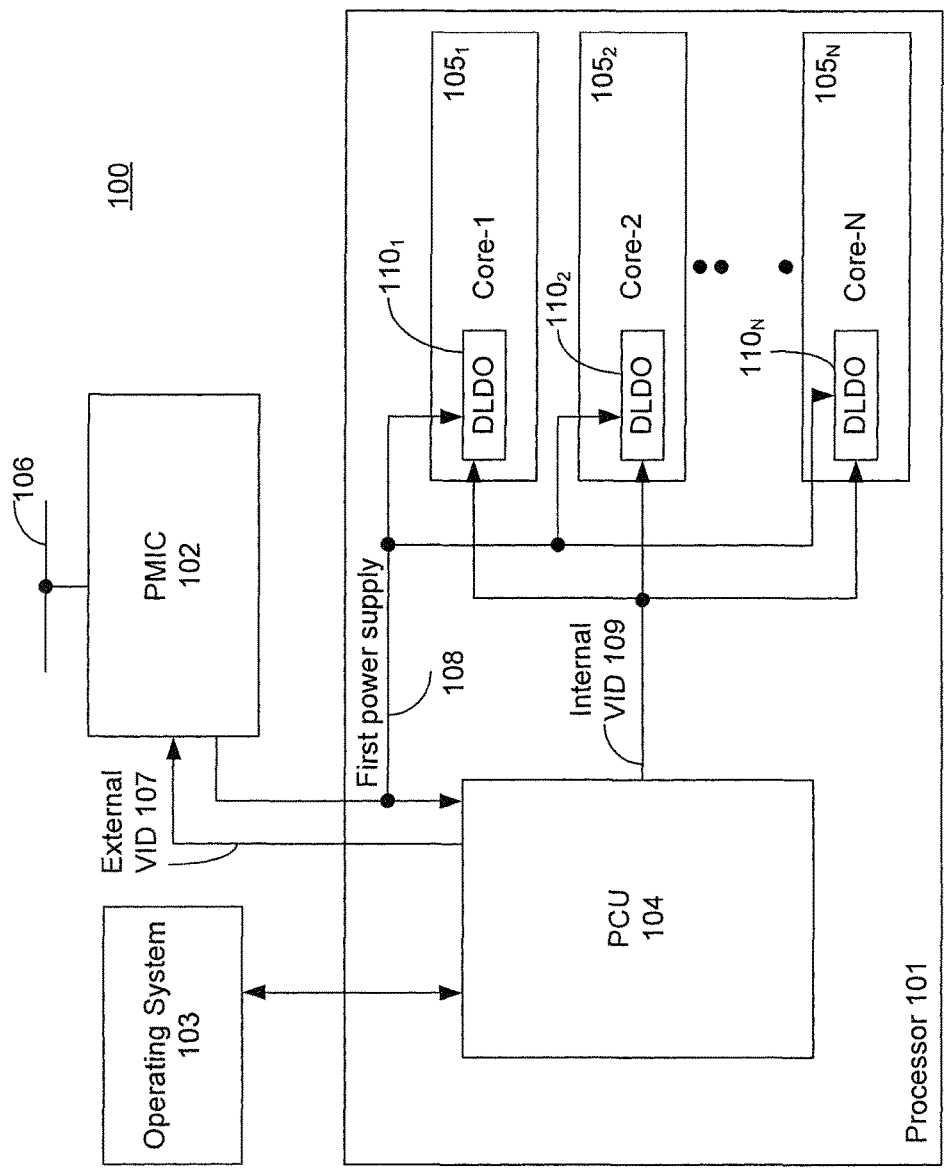
FIG. 1 is a power architecture with multiple voltage identification signals, according to one embodiment of the disclosure.

With the advent of multiple core processors, variable supply voltage for each of the processor (and/or processor core) in a system-on-chip (SOC) may be offered for optimal power performance tradeoffs. In one embodiment, supply voltage to each processor in the SOC is set based on the performance required from it. In one embodiment, an independent power supply for each processor based on voltage identification (VID) is provided. In such an embodiment, each processor has its own power supply controlled by its own VID. In one embodiment, if one of the processors in the SOC needs to run on a lower power supply (e.g., because it is has less workload to execute), VID associated for that processor requests a power supply module external to the SOC to provide a lower power supply to that processor. In such an embodiment, other processors that request to operate on a higher power supply continue to operate on a higher power supply because their respective VIDs inform the power supply module to maintain the higher power supply.

In one embodiment, integrated voltage regulators (VRs), which are integrated within the SOC, are used to provide power supply for each processor in the SOC. In such an embodiment, a fixed voltage power rail is used as input to the integrated VR and the VID based power supply voltages are generated by the integrated VR for each processor. In one embodiment, the integrated VR operates in step down mode from a higher input supply voltage. In one embodiment, the integrated VR operates by cascading two VRs—one VR from a battery source (or power outlet) to the SOC, and the other VR from within the SOC to the individual VRs associated with each processor.

The embodiments describe an apparatus (e.g., SOC, processor, computer system, etc.) which comprises: a first processing core; a second processing core; and a power control unit (PCU) which is operable to: generate a first VID (also called external VID) for an off-die VR external to the apparatus, the first VID resulting in a first power supply for the first processing core; and generate a second VID (also called internal VID) different from the first VID, the second VID resulting in a second power supply for the second processing core.

One non-limiting effect of having first (external) and second (internal) VIDs is that first VID is set for a processing core operating with highest performance (e.g., turbo mode with high frequency and power requirements) while the second VID and other internal VIDs (i.e., internal to the SOC) are used for other processing cores that are operating with lower performance (e.g., low power mode, standby mode, sleep mode). By separating the VIDs into external and internal VIDs, overall power performance of the SOC is managed optimally because different processors are able to operate on different power supplies.

The embodiments describe an apparatus, e.g., digital low dropout (DLDO) VR, which comprises: a plurality of power-gate transistors controllable by a digital bus, the plurality of power-gate transistors operable to provide a first power supply to a processing core, and to receive a second power supply as input; an analog to digital converter (ADC) to receive the first power supply and to generate a digital output representative of the first power supply; and a controller to receive the digital output representative of the first power supply and to generate the digital bus for controlling the plurality of power-gate transistors.

There are several technical effects of the DLDO VR. Some non-limiting technical effects include near elimination of DC current path in a controller of the DLDO VR since it is a synthesized logic with low quiescent current in standby mode. In one embodiment, the coefficients of the DLDO VR controller are reprogrammable which allow the loop in the DLDO VR to be tuned late even after the SOC is fabricated. In one embodiment, the controller of the DLDO VR compensates for the pole on the output node of the DLDO VR, and so there is nearly zero DC gain error in the DLDO VR loop. The DLDO VR of the embodiments allow for soft start of the power-gates using digital control. The architecture of the DLDO VR allows for designers to have control over the distribution of power-gates with similar weights to ensure uniform power delivery to all sections of the load (driven by the DLDO VR).

The embodiment of the DLDO VR allows for employing non-linear control features like asymmetric/non-linear gain functions to improve the droop response of the VR. The embodiment of the DLDO VR allows for input voltage to be defined by a digital VID code, which is simpler to implement (compared to analog circuits) in the digital domain. The embodiment of the DLDO VR allows for integrating simpler Design-for-Test (DFT) circuits as more circuits of the DLDO VR are digital (compared to a regular LDO). Such DFTs can allow for High Volume Manufacturing (HVM) testing.

The embodiments describe an apparatus for improving reliability of power gates, the apparatus comprising: a plurality of rows of power gate transistors; and a control unit to control the power gate transistors in each row in the plurality of rows, where the control unit is operable to rotate over time an active row of power gates such that the total active power gates is the same during rotation.

One non-limiting technical effect of the apparatus discussed above is that device aging and other reliability issues (e.g., electro-migration, self-hearing, etc.) are mitigated by rotating the active row(s) of power gates in a bank of power gates. The term "active" generally refers to devices that are turned on. Other technical effects of the embodiments discussed are evident from the description.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a", "an", and "the" include plural references. The meaning of "in" includes "in" and "on."

The term "scaling" generally refers to converting a design (schematic and layout) from one process technology to another process technology. The term "scaling" generally also refers to downsizing layout and devices within the same technology node. The terms "substantially," "close," "approximately," "near," "about," generally refer to being within +/−20% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors are metal oxide semiconductor (MOS) transistors, which include drain, source, gate, and bulk terminals. The transistors also include Tri-Gate and FinFet transistors. Source and drain terminals may be identical terminals and are interchangeably used herein. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates a n-type transistor (e.g., NMOS, NPN BJT, etc.) and the term "MP" indicates a p-type transistor (e.g., PMOS, PNP BJT, etc.).

The term "power state" or "power mode" generally refers to performance level of the processor or SOC. Power states may be defined by Advanced Configuration and Power Interface (ACPI) specification, Revision 5.0, Published Nov. 23, 2011. However, the embodiments are not limited to ACPI power states. Other standards and non-standards defining power state may also be used.

FIG. 1 is a power architecture 100 with multiple VID signals, according to one embodiment of the disclosure. In one embodiment, power architecture 100 comprises a processor 101, a power module integrated circuit (PMIC) 102, and an operating system 103.

In one embodiment, processor 101 comprises one or more processing cores $105_{1-N}$, where 'N' is an integer greater than 1. In one embodiment, a control unit 104 (e.g., a power control unit (PCU)) is operable (e.g., via operating system 103) to generate at least two VID codes to provide power supply to various components of the processor 101.

In one embodiment, PCU 104 sends out VID 107 (also called external VID or first VID) to PMIC 102. In one embodiment, PMIC 102 is an off-die VR i.e., not integrated on the same die as processor 101. In one embodiment, PMIC 102 is positioned in the same package as package for processor 101. In one embodiment, PMIC 102 is fully integrated in processor 101 (i.e., PMIC 102 is on the same die as processor 101).

In one embodiment, VID 107 is 7 bits of VID code. In other embodiments, fewer or more bits of code may be used to represent VID. In one embodiment, VID 107 is a request code for requesting PMIC 102 to provide power supply corresponding to VID 107. In one embodiment, PMIC 102 receives an external power supply 106 (e.g., from a power outlet, computer battery, etc.) and generates a regulated first power supply 108 corresponding to the VID 107. For example, VID 107 indicates to PMIC 102 that a 1.15V is needed to power processor 101. PMIC 102 then generates a regulated 1.15V power supply as first power supply 108. In one embodiment, some or all processing cores $105_{1-N}$ receive first power supply 108.

In one embodiment, PCU 104 sends out a second VID 109 (also called internal VID) to some or all processor cores $105_{1-N}$. In one embodiment, each processor core receives an independent VID (shown for simplicity sake as a single bus 109). In such an embodiment, each independent VID 109 provides the power supply setting for the individual processor core. In one embodiment, each processing core includes a digital low-dropout (DLDO) voltage regulator e.g., $110_{1-N}$, where 'N' is an integer. DLDO VR is described with reference to FIG. 6.

Referring back to FIG. 1, in one embodiment each DLDO VR receives first power supply 108 as an input power supply, and also receives its VID 109 which is used to instruct the DLDO VR to generate a particular level of output power supply for that core. For example, DLDO VR $110_1$ receives VID 109 and generates a 0.9V regulated power supply for core-1 $105_1$ using 1.15V first power supply 108. In another example, DLDO VR $110_2$ receives its corresponding VID 109 and generates a 0.9V regulated power supply for core-2 $105_2$ using 1.15V first power supply 108 as input. Using the above example, in one embodiment, DLDO VR $110_1$ can seamlessly (i.e., seamless to its load) provide a regulated power supply of 0.9V from previous 1.15V even when the first power supply 108 is lowered to 1.0V by the external VID 107.

In one embodiment, individual processor cores $105_{1-N}$ are coupled to the first power supply 108 via integrated VRs (e.g., DLDO VRs $110_{1-N}$) and the output voltage of these integrated VRs are defined by internal VID 109. In one embodiment, internal VID 109 is also 7 bits of code like external VID 107. In other embodiments, internal VID 109 and external VID 107 have different number of bits.

In one embodiment, external VID 107 setting is defined by the voltage required by the processor core (among processor cores $105_{1-N}$) wanting to operate with highest performance (e.g., high power and high frequency—turbo mode). In one embodiment, DLDO VR of that processor core operates in bypass mode and receives internal VID 109 to cause a controller of DLDO VR to turn on all power-gates of the DLDO VR. In such an embodiment, for all other processing cores that have a lower performance requirement, internal VID 109 for those processing cores is set such that corresponding DLDO VRs (or integrated VRs) have a lower output voltage to match the requirement for the required performance.

In one embodiment, since the processing core operating at the highest performance will have its integrated VR (i.e., DLDO VR) operating in bypass mode (i.e., all or most power-gates are on), there is no (or nearly zero) power loss due to cascading effect of two or more VRs. In such an embodiment, for all other processing cores operating at a lower performance mode, power is saved because the input supply voltage for the corresponding VRs (i.e., DLDO VRs of those processers operating in lower performance mode) is scaled down. In one embodiment, when all processing cores $105_{1-N}$ are operating in the same performance mode then all the integrated VRs are in bypass mode and the voltage for the processing cores $105_{1-N}$ are set by the external VID 107. In one embodiment, different processing cores can seamlessly transition into different power states and the internal and external VIDs (109 and 107) can be changed as required for various scenarios.

While the embodiment of FIG. 1 illustrates a power architecture with multiple VIDs using DLDO VRs $110_{1-N}$, in one embodiment, other architectures of voltage regulators may be used instead of DLDO VRs $110_{1-N}$ that employ the use of multiple VIDs.

Figure 2:
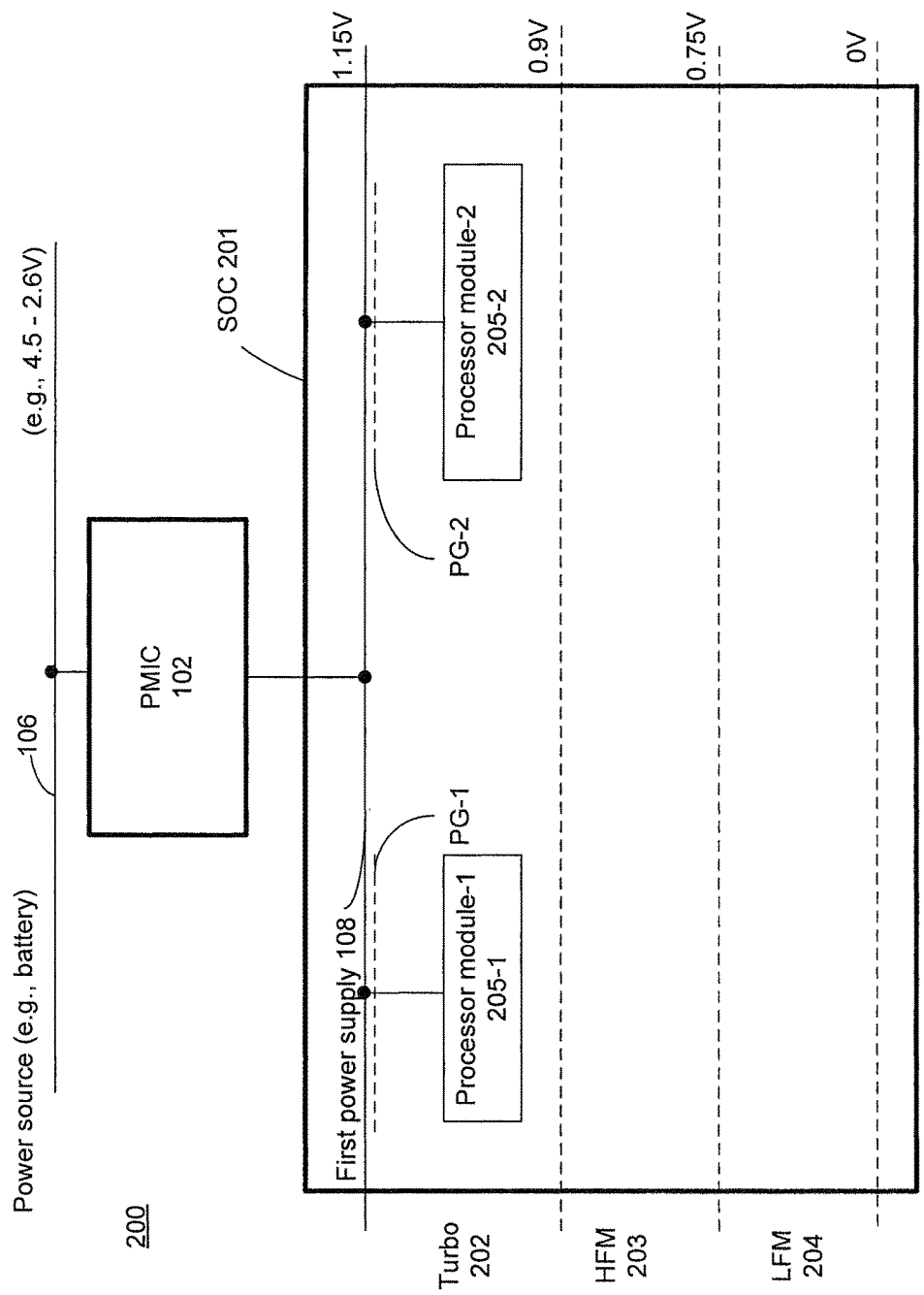
FIG. 2 is an operational architectural illustration of a System-on-Chip (SOC) using power-gates to supply power to processor modules operating at same performance levels.

FIG. 2 is an operational architectural illustration 200 of a System-on-Chip (SOC) using power-gates to supply power to processor modules operating at same performance levels. It is pointed out that those elements of FIG. 2 having the same reference numbers (or names) as the elements of any other figure can operate or function in any manner similar to that described, but are not limited to such.

Architectural illustration 200 shows SOC 201 that can operate in multiple possible performance modes. In this example, three performance modes are described—turbo mode 202, high frequency mode (HFM) 203, and low frequency mode (LFM) 204. The three performance modes are listed to the left of SOC 201 and separated by dashed lines representing the operational power supply level of that performance mode.

For example, turbo mode 202 which is the highest performance mode operates with the highest power supply 1.15V. At higher power supplies, devices are operable to perform with higher speeds compared to the same devices operating at lower supplies, all else being equal. HFM 203 which is the middle performance mode operates with a power supply of 0.9V. LFM 204 which is the lowest performance mode (e.g., low power mode, sleep mode, standby mode, etc.) operates with a power supply of 0.75V. While the architectural illustration 200 shows three performance modes, any number of performance modes may be used. So as not to obscure the embodiments, three performance modes are described.

Architectural illustration 200 shows PMIC 102 which receives input power 106 from power source (e.g., battery, wall outlet, etc.) and generates a regulated first power supply 108 according to the external VID 107. Input power 106 is generally higher than the first power supply 108. For example, input power 106 may be in the range of 4.5V to 2.6V while first power supply 108 is in the range of 1.5V to 0.7V.

SOC 201 is shown with two processor modules—processor module-1 205-1 and processor module-2 205-2 which are operable to perform in any of the three modes. However, SOC 201 may have any number of processor modules. In one embodiment, each processor module is like processor 101 with multiple processing cores $105_{1-N}$. In one embodiment, each processing module is a processing core.

Architectural illustration 200 shows both processor modules 205-1 and 205-2 operating in turbo mode 202 which operate on 1.15V. In one embodiment, respective DLDO VRs $110_1$ and $110_2$ operate in bypass mode (i.e., in power gate mode where all (or nearly all) power gates (in this case PG-1 and PG-2) are turned on) to provide the highest power supply to the processor modules 205-1 and 205-2. PG-1 and PG-2 are illustrated with dashed lines above the respective processor modules 205-1 and 205-2. In one embodiment, internal VID 109 instructs the respective DLDO VRs $110_1$ and $110_2$ to operate in bypass mode where all power gates are on. DLDO VRs $110_1$ and $110_2$ in power gate mode are shown as PG-1 and PG-2, for example.

Figure 3:
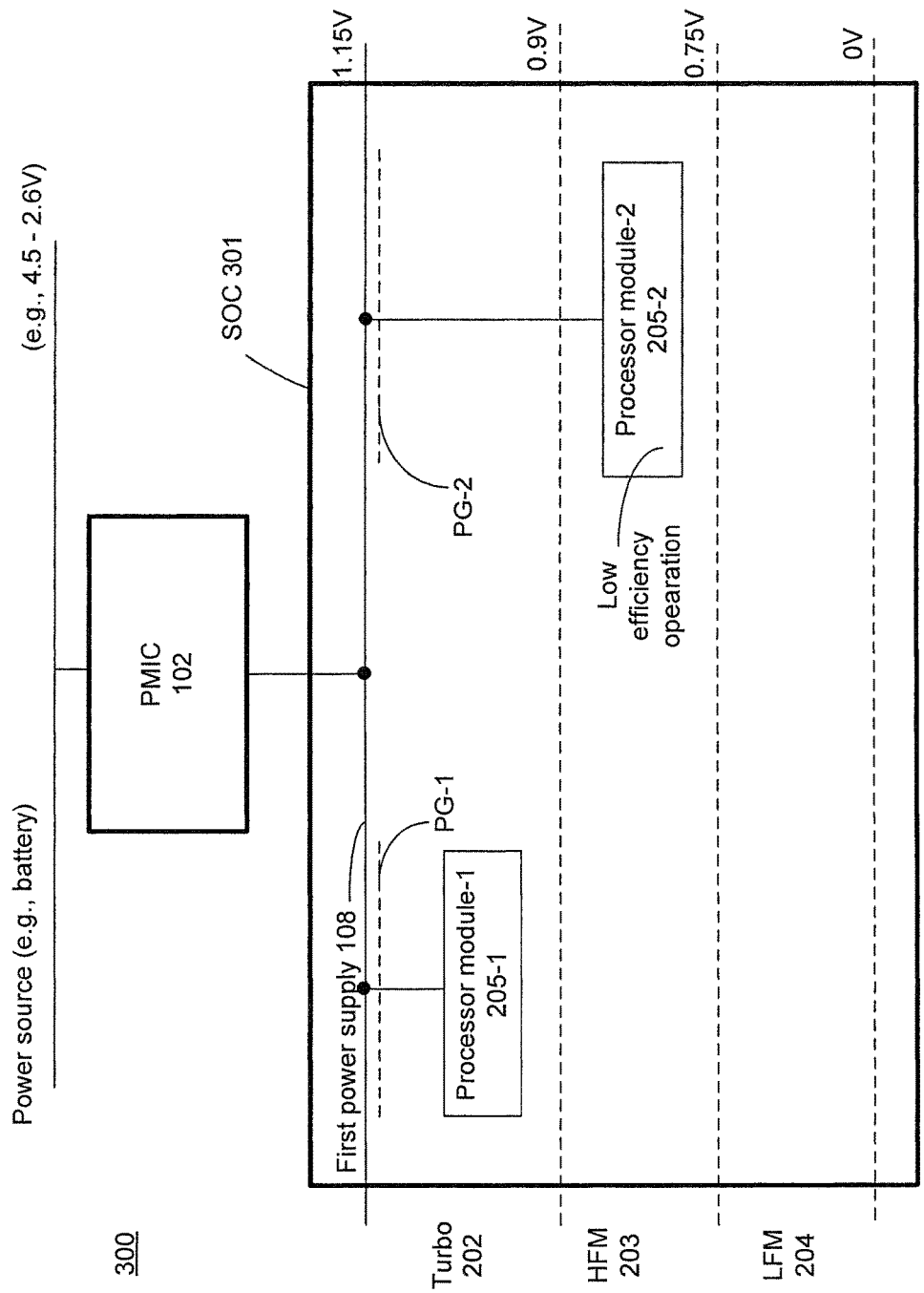
FIG. 3 is an operational architectural illustration of a SOC using power-gates to supply power to processor modules operating at different performance levels.
Figure 4:
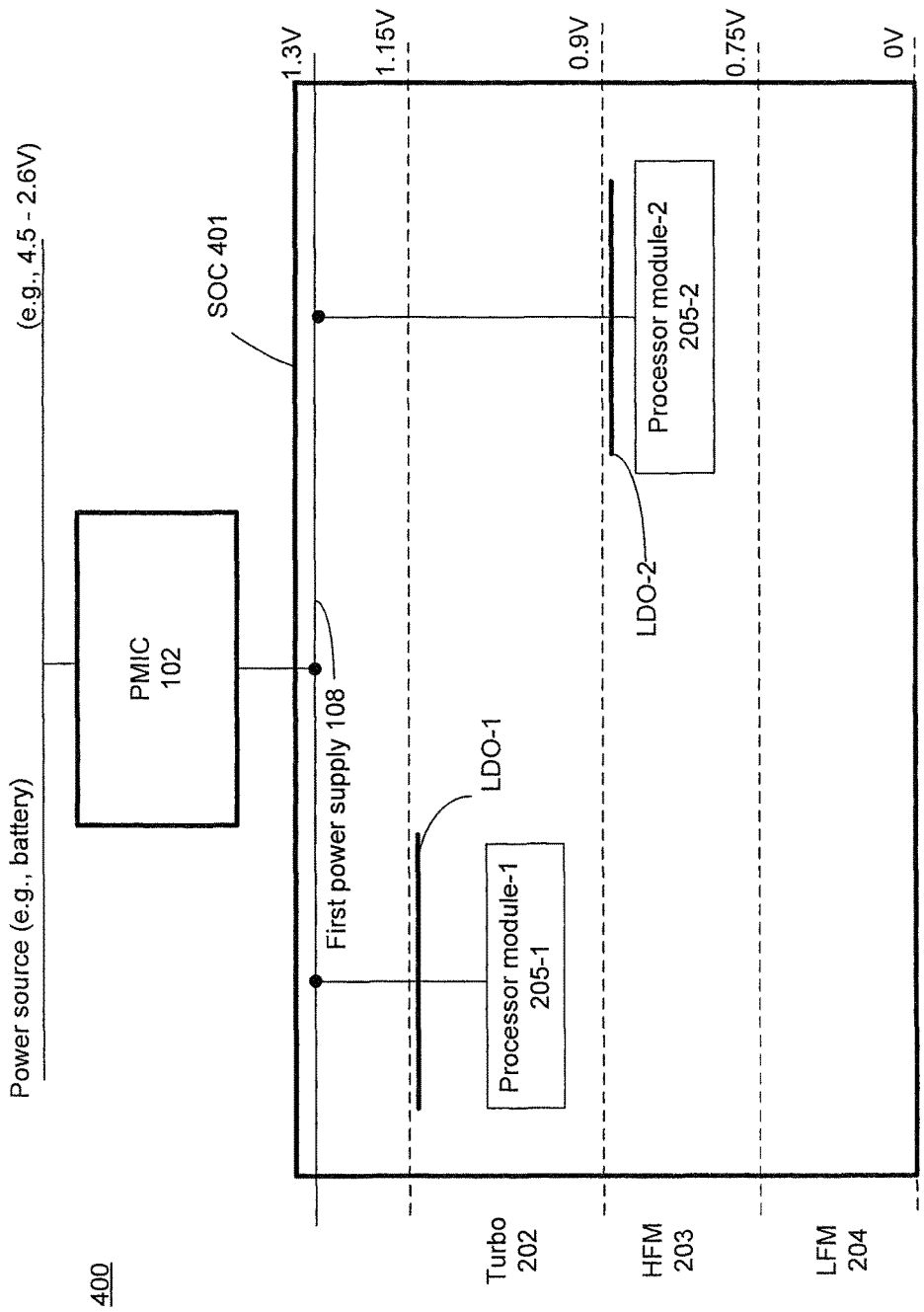
FIG. 4 is an operational architectural illustration of a SOC using LDOs to supply power to processor modules operating at different performance levels.

FIG. 3 and FIG. 4 illustrate architectural illustrations of SOC which use conventional external VID 107 only (i.e., no internal VID to cause independent power supply level management for processor modules).

FIG. 3 is an operational architectural illustration 300 of SOC 301 using power-gates to supply power to processor modules operating at different performance levels. It is pointed out that those elements of FIG. 3 having the same reference numbers (or names) as the elements of any other figure can operate or function in any manner similar to that described, but are not limited to such.

SOC 301 is similar to SOC 201 except that the processor modules of SOC 301 operate in varying performance modes while processor modules of SOC 201 operate in turbo mode. FIG. 3 is similar to FIG. 2 except that processor module-2 205-2 is operating in HFM 203 while processor module-1 205-1 is operating in turbo mode 202.

If processor module-2 205-2 continues to receive its power supply using PG-2, then for processor module-2 205-2 to operate in HFM 203 processor module-2 205-2 lowers is operating frequency while still receiving a higher power supply from PG-2 (which derives this power supply from first power supply 108). Architectural illustration 300 describes the situation when SOC 301 is operating at lower efficiency because it provides power supply to processor module-2 205-2 using PG-2 (power gate) and does not provide a customized lower power supply level for processor-module-2 205-2.

FIG. 4 is an operational architectural illustration 400 of SOC 401 using LDOs to supply power to processor modules operating at different performance levels. It is pointed out that those elements of FIG. 4 having the same reference numbers (or names) as the elements of any other figure can operate or function in any manner similar to that described, but are not limited to such.

SOC 401 is similar to SOC 301 except that processor modules receive their respective power supplies using LDOs instead of power gates—processor module-1 205-1 receives its power supply from LDO-1 while processor module-2 205-2 receives its power supply using LDO-2. To operate a LDO an input power supply (first power supply 108) is regulated to provide an output power supply for the processor module. For the LDO to operate correctly, voltage headroom may be needed by the LDO.

To provide that headroom, PMIC 102 provides a first power supply 108 to be higher (e.g., 1.3V) than 1.15V (illustrated with reference to FIGS. 2-3 that use power gates only to provide power supply to their respective processor modules) for LDO-1 which provides power supply for the processor module-1 205-1 operating in turbo mode 202. Providing power supply for the processor modules using LDOs, a solid line is used (as opposed to dashed lines for power gates PG). In this example, processor module-2 205-2 receives a lower power supply (e.g., 0.9V) because unlike PG-2 of FIG. 3, LDO-2 is operable to provide lower regulated power supply to the processor module-2 205-2 using the first power supply 108 (1.3V in this example).

Compared to processor module-2 205-2 of architectural illustration 300, processor module-2 205-2 of architectural illustration 300 operates with higher power efficiency because LDO-2 provides a lower power supply to processor module-2 205-2 allowing it to use both lower power supply and lower frequency to operating in HFM 203 (which is lower performance mode than turbo mode 202). However, SOC 401 may overall operate in lower power efficiency compared to SOC 301 because to provide power supply to power module-1 205-1, a higher first power supply 108 is provided to processor module-1 205-1.

Figure 5:
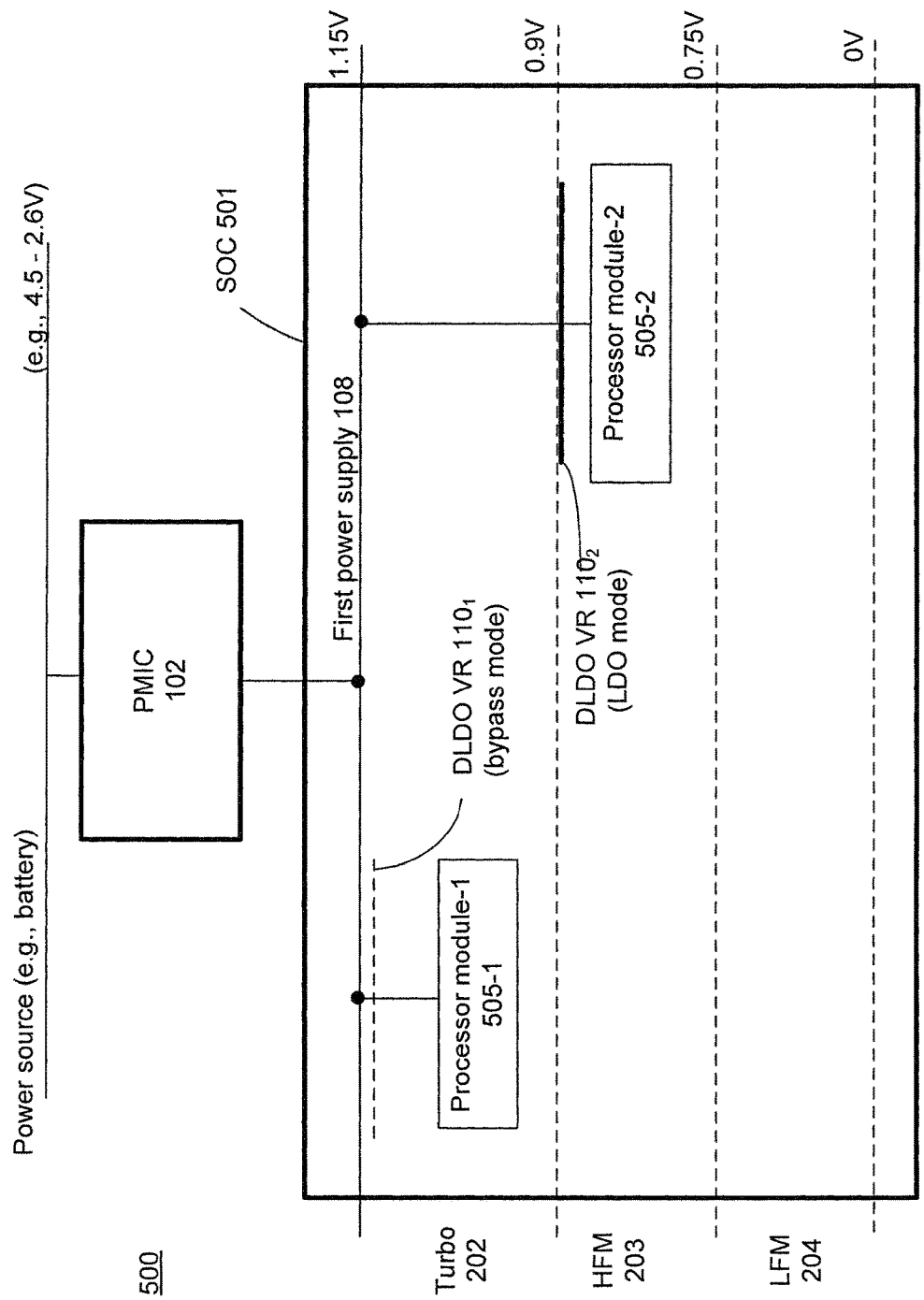
FIG. 5 is an operational architectural illustration of a SOC using digitally synthesizable LDO VRs (DLDO VRs) to supply power to processor modules operating at different performance levels, according to one embodiment of the disclosure.

FIG. 5 is an operational architectural illustration 500 of SOC 501 using digitally synthesizable LDO VRs (DLDO VRs) to supply power to processor modules operating at different performance levels, according to one embodiment of the disclosure. It is pointed out that those elements of FIG. 5 having the same reference numbers (or names) as the elements of any other figure can operate or function in any manner similar to that described, but are not limited to such. Architectural illustration 500 applies multiple VIDs discussed with reference to FIG. 1 and solves the power efficiency problems discussed with reference to FIGS. 3-4. So as not to obscure the embodiments of the disclosure, FIG. 5 is illustrated with reference to FIGS. 1-4.

In one embodiment, PMIC 102 provides first power supply 108 which is set to a level of highest performance operating processor module in SOC 501. In architectural illustration 500, processor module-1 505-1 is operating in turbo mode 202 while processor module-2 505-2 is operating in HFM 203 performance mode. Since, turbo mode 202 in this example operates using 1.15V, first power supply 108 is set to 1.15V by PMIC 102 via external VID 107 provided by PCU 104. In one embodiment, first power supply 108 is provided to all processor modules of SOC 501.

In one embodiment, DLDO VR $110_1$ provides power supply to processor module-1 505-1 while DLDO VR $110_2$ provides power supply to processor module-2 505-2. In one embodiment, internal VID 109 from PCU 104 instructs DLDO VR $110_1$ to operate in bypass mode because processor module-1 505-1 is operating in highest performance mode (i.e., turbo mode 202) that operates with highest power supply level (e.g., 1.15V). In such an embodiment, DLDO VR $110_1$ operates in bypass mode by turning on all (or substantially all) power gates so that there is minimum or no power drop from first power supply 108 to the power supply provided to processor module-1 505-1. In this embodiment, since DLDO VR $110_1$ is not operating in LDO mode, no special headroom is needed for DLDO VR $110_1$ and so PMIC 102 does not need to provide a higher power supply like that provided with reference to FIG. 4.

In one embodiment, DLDO VR $110_2$ provides power supply to processor module-2 505-2. In one embodiment, internal VID 109 from PCU 104 instructs DLDO VR $110_2$ to operate in LDO mode because processor module-2 505-2 is operating in lower performance mode than turbo mode (i.e., HFM 203) that operates with lower power supply level (e.g., 0.9V instead of 1.15V). In such an embodiment, DLDO VR $110_2$ operates in LDO mode by operating in a feedback loop and turning on enough power gates so that output power supply drops from first power supply 108 to the power supply (e.g., 0.9V) provided to processor module-2 505-2. In this embodiment, a lower first power supply 108 (compared to first power supply 108 of FIG. 4) is provided as input power supply to DLDO VR 110₂ and so the power efficiency loss described with reference FIGS. 3 and 4 is not observed by this embodiment.

Figure 6:
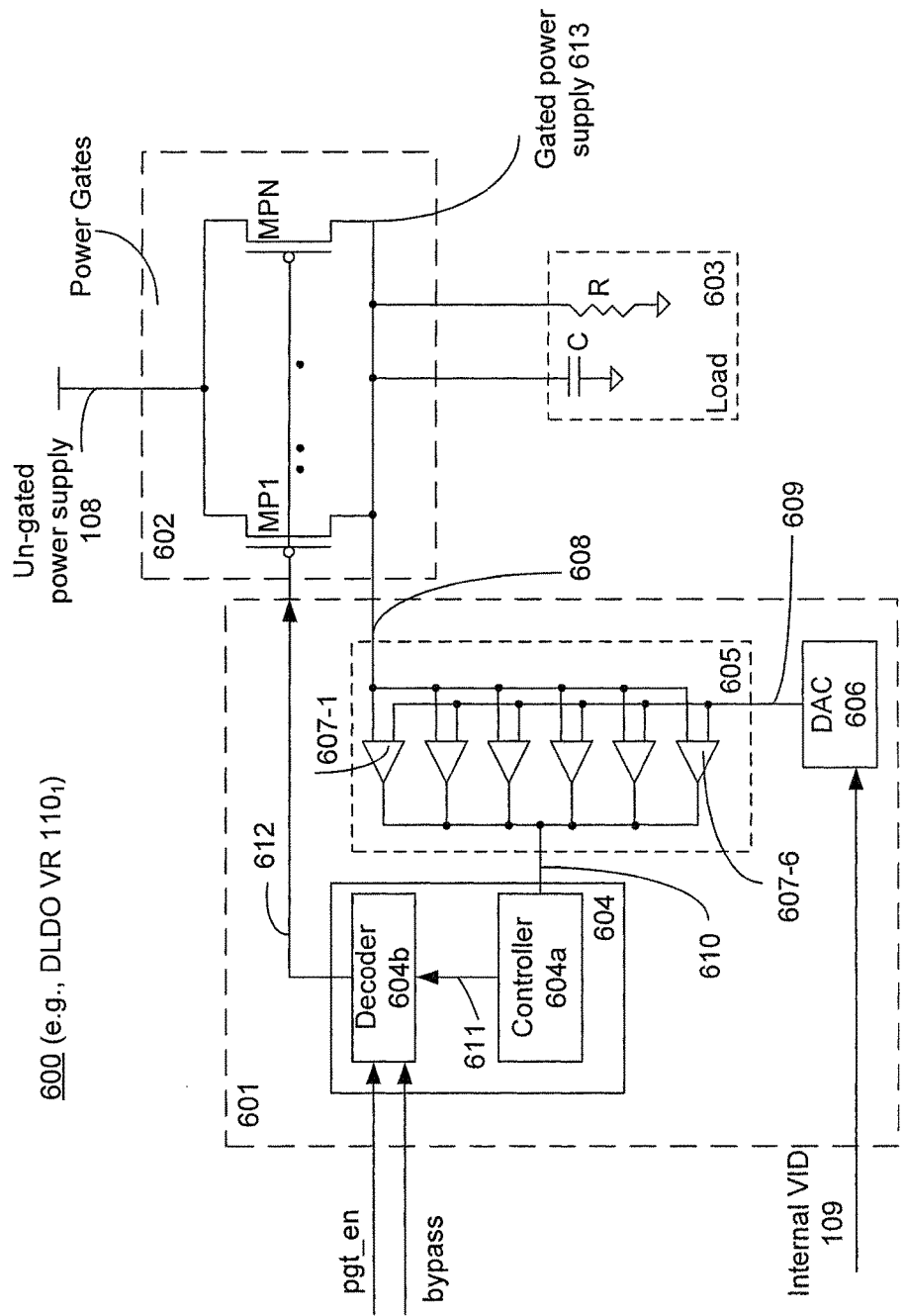
FIG. 6 is a DLDO VR, according to one embodiment of the disclosure.

FIG. 6 is a DLDO VR 600 (e.g., DLDO VR 110₁), according to one embodiment of the disclosure. It is pointed out that those elements of FIG. 6 having the same reference numbers (or names) as the elements of any other figure can operate or function in any manner similar to that described, but are not limited to such.

In one embodiment, DLDO VR 600 comprises logic 601 and power gates 602 to provide gated power supply 613 to load 603. In one embodiment, logic 601 comprises control unit 604, analog to digital converter (ADC) 605, and digital to analog converter (DAC) 606. In one embodiment, control unit 604 comprises controller 604a and decoder 604b. In one embodiment, controller 604a receives an output of ADC 605 to generate signal 611 which represents strength of power gates 602. In one embodiment, decoder 604b receives signal 611 and decodes it into digital code 612 to turn on/off power gates 602. In one embodiment, decoder 604b generates a binary coded digital code 612. In one embodiment, decoder 604b generates a thermometer coded digital code 612. In other embodiment, decoder 604b employs other forms of coding schemes to generate digital code 612.

In one embodiment, decoder 604b receives bypass signal from PCU 104 to instruct DLDO VR 600 to operate in bypass mode. In one embodiment, decoder 604b generates digital code 612 to cause all (or substantially all) power gates to turn on when bypass signal indicates bypass mode. In such an embodiment, output of ADC 605 and controller 604a are bypassed. In one embodiment, when all (or substantially all) power gates of 602 are turned on, gated power supply 613 is substantially the same (in voltage level and current drive) as un-gated power supply 108 (same as first power supply 108). In one embodiment, when bypass signal indicates that DLDO VR 600 should operate in normal mode (i.e., LDO mode), decoder 604b decodes signal 611 from controller 604a. In such an embodiment, ADC 605 is not bypassed and feedback loop from 608 to 612 is functional.

In one embodiment, decoder 604b receives pgt_en signal (power gate enable) to enable or disable power gates 602. For example, when processor module operates in LFM 204 (lowest power state), power gate 602 is turned off so that gated power supply 613 is floating. In this example, pgt_en signal instructs decoder 604b to generate digital code 612 which turns off all power gate devices in power gate 602. In one embodiment, when pgt_en signal is enabled, decoder 604b operates in normal (i.e., LDO mode) or bypass mode.

In one embodiment, controller 604a receives a digital representation of gated power supply 613 and determines whether to raise or lower gated power supply 613. In one embodiment, during LDO mode, control unit 604 causes devices of power gate 602 to turn on or off to modulate effective resistance of power gate 602 to achieve a gated power supply 613 for a given load current (of load 603). In such an embodiment, power gate 602 operates like a linear voltage regulator with a wide operating range. In one embodiment, controller 604a compensates for any dominant pole in the DLDO VR 600.

In one embodiment, power gate 602 comprises p-type devices (MP1-MPN, where 'N' is an integer greater than 1) with source and drain terminals coupled between un-gated power supply 108 and gated power supply 613. In such an embodiment, gate terminals of the p-type devices are driven by digital code 612. In one embodiment, power gate 602 comprises n-type devices (not shown) with source and drain terminals coupled between un-gated power supply 108 and gated power supply 613. In such an embodiment, gate terminals of the n-type devices are driven by an inverse of digital code 612. In one embodiment, power gate 602 comprises a combination of n-type and p-type devices coupled between un-gated power supply 108 and gated power supply 613. In such an embodiment, gate terminals of p-type devices are driven by digital code 612 while gate devices of n-type devices are driven by inverse of digital code 612.

In one embodiment, resistors are coupled in series to n-type and/or p-type devices, where one end of the resistor (s) is coupled to the source/drain terminals of the n-type and/or p-type devices while the other end of the resistor(s) is coupled to the gated power supply 613. In other embodiments, other combination of transistors and active/passive devices may be used to implement power gate 602 which is controllable by digital code 612 (and/or inverse of digital code 612). In one embodiment, devices of power gate 602 operate in triode region (or linear region) and gated power supply 613 is modulated (by control unit 604) by turning on and/or off devices of power gate 602.

In one embodiment, DLDO VR 600 is a two pole system. The first pole being the pole associated with gated power supply 613, which is defined by impedance of load 603 and the output impedance of power gate 602. The second pole being an integration pole introduced by controller 604 at the origin to reduce steady state error to zero. In one embodiment, control unit 604 compensates for the pole associated with gated power supply 613, which is defined by impedance of load 603 and the output impedance of power gate 602 (as seen from load 603). In such an embodiment, the pole associated with gated power supply 613 is compensated by introducing a zero and without lowering loop gain and bandwidth. The lead compensation performed by control unit 604 enhances bandwidth and gain of DLDO VR 600. A mathematical model of controller 604a that performs lead compensation is described with reference to FIG. 7.

Referring back to FIG. 6, in one embodiment, ADC 605 is a flash ADC. In one embodiment, ADC 605 is a windowed flash ADC. In one embodiment, ADC 605 is a Sigma Delta ADC. In another embodiment, ADC 605 is a Full flash ADC. In one embodiment, ADC 605 comprises a plurality of comparators 607-1 to 607-N, where 'N' is an integer greater than 1. In this example, N=6 and so the ADC is a 6-bit ADC having six comparators 607-1 to 607-N. In one embodiment, comparator 607-1 is a differential comparator which receives an input from DAC 606 and another input from gated power supply 613. The output of comparator 607-1 is a digital signal indicating whether gated power supply 613 is higher or lower than the input from DAC 606, which is one of the reference voltages of reference voltage bus 606.

In one embodiment, DAC 606 receives internal VID 109 and converts that to a bus of reference signals 609 which are analog representation of internal VID 109. In one embodiment, DAC 606 generates bus of reference signals 609 each of which is separated by 10 mV. In other embodiments, other levels of granularity may be used for reference signals 609. In one embodiment, DAC 606 is implemented with a string of resistors coupled together in series. In one embodiment, DAC 606 is a current steering DAC. In another embodiment, DAC 606 is an R/2R DAC which is an alternative to binary-weighted-input DAC.

In one embodiment, comparator 607-6 receives a first reference voltage from bus of reference signals 609. In one embodiment, comparator 607-6 receives second reference voltage from bus of reference signals 609, the second reference voltage being 'X' mV more than first reference voltage. In one embodiment, comparator 607-1 receives sixth reference voltage from bus of reference signals 609, the sixth reference voltage being 6 times 'X' mV more than first reference voltage. In other embodiments, order of assignment of reference signals 609 to comparators of ADC 605 may be reversed.

In one embodiment, output 610 of ADC 605 indicates digital representation of gated power supply 613. In one embodiment, output 610 is thermometer coded and is converted into binary code by a thermometer to binary converter (not shown), and the binary code is provided to control unit 604. In other embodiments, output 610 of ADC 605 is directly received by control unit 604 without having to convert from thermometer code to binary code.

In one embodiment, control unit 604 can be synthesized using RTL (register hardware language) because components of control unit 604 are digital. There are several technical effects of using digital control unit 604 in DLDO VR 600. Some non-limiting technical effects of control unit 604 in particular and DLDO VR 600 in general include near elimination of DC current path in control unit 604 of DLDO VR 600 since it is a synthesized logic with low quiescent current in standby mode.

In one embodiment, the coefficients of controller 604a are reprogrammable which allow the loop in DLDO VR 600 to be tuned late even after the SOC is fabricated. In one embodiment, controller 604a compensates for the pole on the output node of DLDO VR 600, and so there is nearly zero DC gain error in the DLDO VR loop. In one embodiment, DLDO VR 600 allows for soft start of the power-gate 602 using digital code 612. DLDO VR 600 allows for designers to have control over the distribution of power-gate devices (e.g., MP1-MPN) with similar weights to ensure uniform power delivery to all sections of the load 603. This will ensure, for example, that the load line does not cause a non-uniform voltage drop based on which section of the load is drawing current.

In one embodiment, DLDO VR 600 allows for employing non-linear control features like asymmetric/non-linear gain functions to improve the droop response of the VR. For example, when error voltage to ADC 605 is high enough to exceed the range of the windowed ADC, the error is assumed to be high enough (i.e., out of bounds) to cause the DLDO VR 600 to exit from linear gain control. In this condition, a large (programmable) number of FETs in 602 are turned on instantly in one clock period to provide extra charge to load 603. Such non-linear control feature is used to compensate for the droop in the supply voltage 608, according to one embodiment.

In one embodiment, DLDO VR 600 allows for input voltage (e.g., reference signals 609) to be defined by a digital internal VID code 109, which is simpler to implement (compared to analog circuits) in the digital domain. In one embodiment, DLDO VR 600 allows for integrating simpler DFT circuits as more circuits of DLDO VR 600 are digital (compared to a regular LDO). Such DFTs can allow for HVM testing.

One incentive of using DLDO VR 600 is that processor cores (or modules) of a processor or SOC can smoothly transition from bypass to regulation mode (i.e., LDO mode) in small steps (e.g., 10 mV). This allows modulation of gated power supply 613 based on processor or SOC performance with dynamic change of power states. In one embodiment, DLDO VR 600 also allows the fine tuning of gated power supply 613 to each processor core (or module) that are at the same level of performance (e.g., turbo mode 202, HFM 203, etc.) due to random and systematic process variations in the die for binning purposes. Due to process variations, even for functioning at same performance levels, different processor cores (e.g., $105_{1-N}$) may need different voltages. For example, slower processor cores may need higher supply voltage to churn out same performance and faster processor cores may need lower supply voltage to churn out same performance as the slower processor. In one embodiment, the internal VID 109 provides the ability to tune the supply voltage to each processor core by a predefined (or programmable) amount without needing voltage level shifters in the input output logic. In one embodiment, the predefined (or programmable) amount is +/−50 mV. In other embodiments, other voltage levels may be used for the predefined (or programmable) amount. This capability (via internal VID 109) gives additional power savings to the system since individual processor cores can be tuned to a suited voltage.

Figure 7:
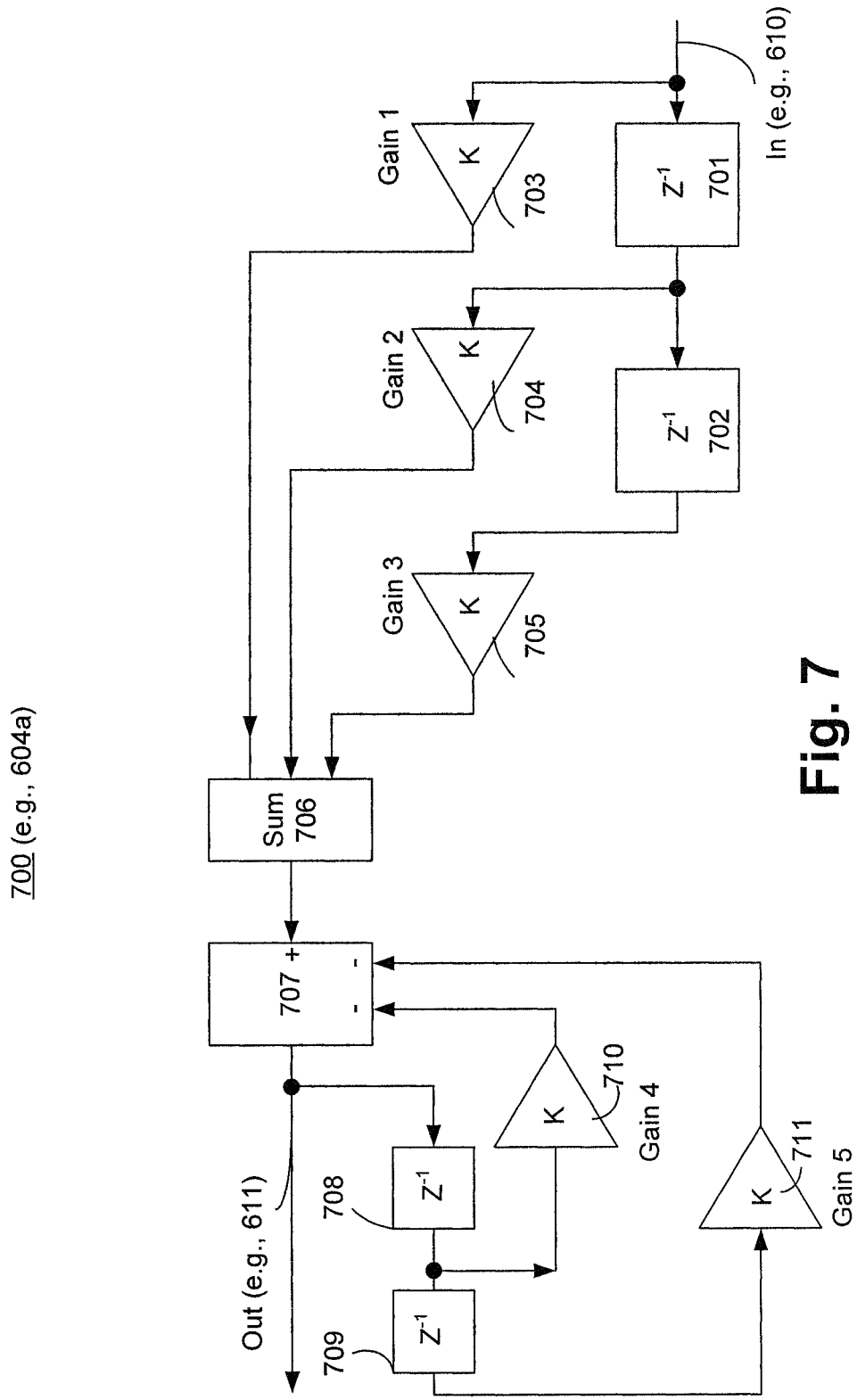
FIG. 7 is a mathematical model for implementing a controller of the DLDO VR, according to one embodiment of the disclosure.

FIG. 7 is a mathematical model 700 for implementing a controller (e.g., 604a) of DLDO VR 600, according to one embodiment of the disclosure. It is pointed out that those elements of FIG. 7 having the same reference numbers (or names) as the elements of any other figure can operate or function in any manner similar to that described, but are not limited to such.

In one embodiment, mathematical model 700 comprises first delay stage 701 ($Z^{-1}$) which receives input 610 from ADC 605. In one embodiment, output of delay stage 701 is received by second delay stage 702 ($Z^{-1}$). In one embodiment, input 610 and its delayed versions from delay stages 701 and 702 are amplified by gain stages 703 (Gain 1), 704 (Gain 2), and 705 (Gain 3), respectively, where "K" indicates gain amount. In one embodiment, output of the gain stages 703, 704, and 705 are summed by summing unit 706.

In one embodiment, output of summing unit 706 is received by another logic unit 707 which adds the output with the previous value of the output and subtracts two signals. In one embodiment, output 611 of controller 604a is delayed by third delay stage 708 ($Z^{-1}$). In one embodiment, output of third delay stage 708 is further delayed by fourth delay stage 709 ($Z^{-1}$). In one embodiment, outputs of third and fourth delay stages are amplified by gain units 710 (Gain 4) and 711 (Gain 5). In one embodiment, outputs of gain units 710 and 711 are received by logic unit 707. In one embodiment, logic unit 707 subtracts outputs of gain units 710 and 711 from output of summing unit 706 to generate output 611. In one embodiment, output 611 is decoded by decoder 604b to generate digital code 612 to control power gate 602.

In one embodiment, logic unit 707 adds gains to the error signal, adds an integration function to reduce the DC error to zero (or close to zero), and also adds a pole and a zero to compensate for the load pole. The error signal is the voltage difference between the output node (e.g., 608) and the reference node (e.g., 609) of the regulator (e.g., 600). In one embodiment, the added zero compensates the effect of the load pole and the added pole ensures that the gain will be attenuated to below 0 dB beyond a certain frequency.

Figure 8:
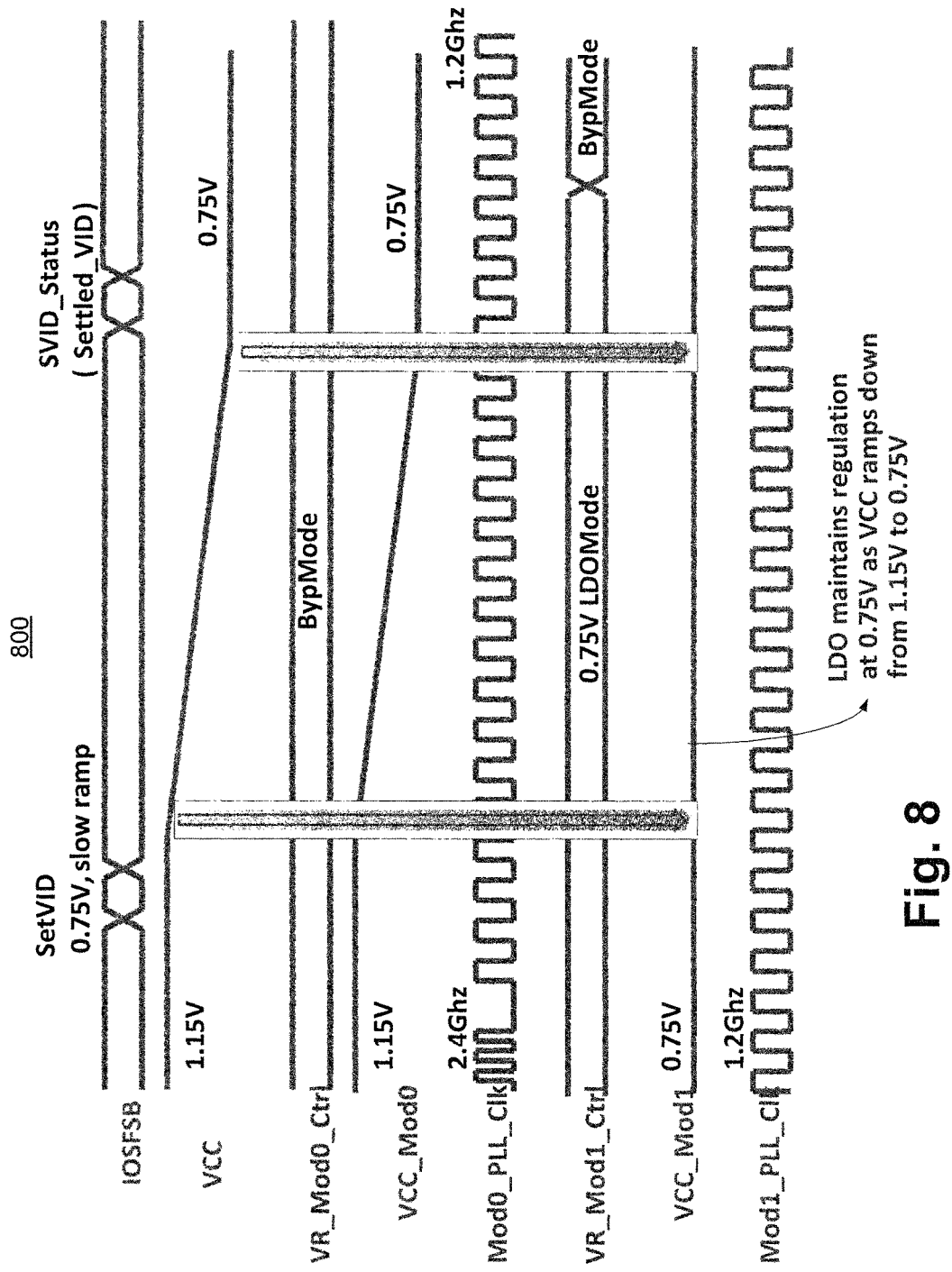
FIG. 8 is a timing diagram illustrating operation of a DLDO VR in bypass and LDO modes, according to one embodiment of the disclosure.

FIG. 8 is a timing diagram 800 illustrating operation of DLDO VR (e.g., 600) in bypass and LDO modes, according to one embodiment of the disclosure. It is pointed out that those elements of FIG. 8 having the same reference numbers (or names) as the elements of any other figure can operate or function in any manner similar to that described, but are not limited to such.

The timing diagram 800 shows voltage regulation by DLDO VR (e.g., 600) in a SOC (e.g., 501) with two processor modules. In this example, one of the processor modules is operating in LFM 204 (which in this example operates at 0.75V power supply), and the other processor module which initially operates in turbo mode 202 and then operates in LFM 204. Timing diagram 800 shows the ramping down of power supply (first power supply 108) for the processor modules from 1.15V to 0.75V because the processor module operating in turbo mode 202 is also moving to standby mode (same as LFM 204) so that all processor modules in the SOC are now operating in LFM 204. Timing diagram 800 shows that before ramping down the first supply voltage 108, the performance of the processor core (among the processor cores 105$_{1-N}$) that is running in high performance mode (e.g., turbo mode 202) is lowered to a lower performance (e.g., LFM 204) by reducing clock frequency of the processor core, then the ramp on the first power supply voltage 108 is introduced.

The first signal from the top is IOSFSB which is external VID 107. External VID 107 is provided by PCU 104 to PMIC 102 to set first power supply 108. The second signal from the top is VCC which is first power supply 108. VCC begins at 1.15V because one of the processor modules is operating in turbo mode 202 which requires 1.15V of power supply. The DLDO VR of that processor module (operating in turbo mode 202) operates in bypass mode with all (or substantially all) power gates of power gate 602 turned on.

The third signal from the top is VR_Mod0_Ctrl (same as bypass signal of FIG. 6 which is received as input to decoder 604b). VR_Mod0_Ctrl corresponds to the processor module operating in turbo mode 202 and which later transitions to LFM 204. The fourth signal from the top is VCC_Mod0 which is the power supply (e.g., gated power supply 613) generated by DLDO VR of the processor module initially operating in turbo mode 202 and then LFM 204.

In this example, first power supply 108 (same as VCC) is set according to the highest performing processor module in the SOC. Since, the processor module operating in turbo mode 202 causes PCU 104 to set first power supply 108 at 1.15V (highest power supply), all processor modules in the SOC receive first power supply 108 of 1.15V. Later when the highest performing processor module moves to a lower performance mode, in this case to LFM 204, PCU 104 causes the PMIC 102 to set the first power supply 108 to 0.75V because all processor modules are operating in that performance mode.

In this example, the PLL (Phase Locked Loop) of processor module which initially operates in turbo mode 202 and then LFM 204, adjusts its frequency according to the performance mode. The fifth signal from the top is Mod0_PLL_Clk which is the PLL signal of the processor module that initially operates in turbo mode 202 and then LFM 204 (i.e., PLL reduces its frequency from 2.4 GHz to 1.2 GHz).

In this example, the processor module in the SOC which was operating in LFM 204 continues to operate in that mode. The DLDO VR for that processor module initially operates in LDO mode because first power supply 108 is set to 1.15V according to the highest performing processor (which was initially operating in turbo mode 202). When the processor module operating in turbo mode 202 begins to operate in LFM 204, first power supply 108 reduces from 1.15V to 0.75V. Since, first power supply 108 is lowered for all processor modules, the DLDO VR of the processor module operating in LFM 204 (and which continues to operate in that mode) now operates in bypass mode instead of LDO mode.

The sixth signal from the top is VR_Mod1_Ctrl which indicates the DLDO VR operating mode for the processor module which initially operates in LDO mode and then to bypass mode (because all processors are operating in LFM 204 and first power supply 108 is lowered from 1.15V to LFM 204 power supply of 0.75V).

The seventh signal from the top is VCC_Mod1 which is the power supply generated by the DLDO VR of the processor module always operating in LFM 204 at 0.75V. The eighth signal from the top is Mod1_PLL_Clk which is the PLL clock signal of the processor module always operating in LFM 204. In this example, Mod1_PLL_Clk remains at 1.2 GHz.

Figure 9:
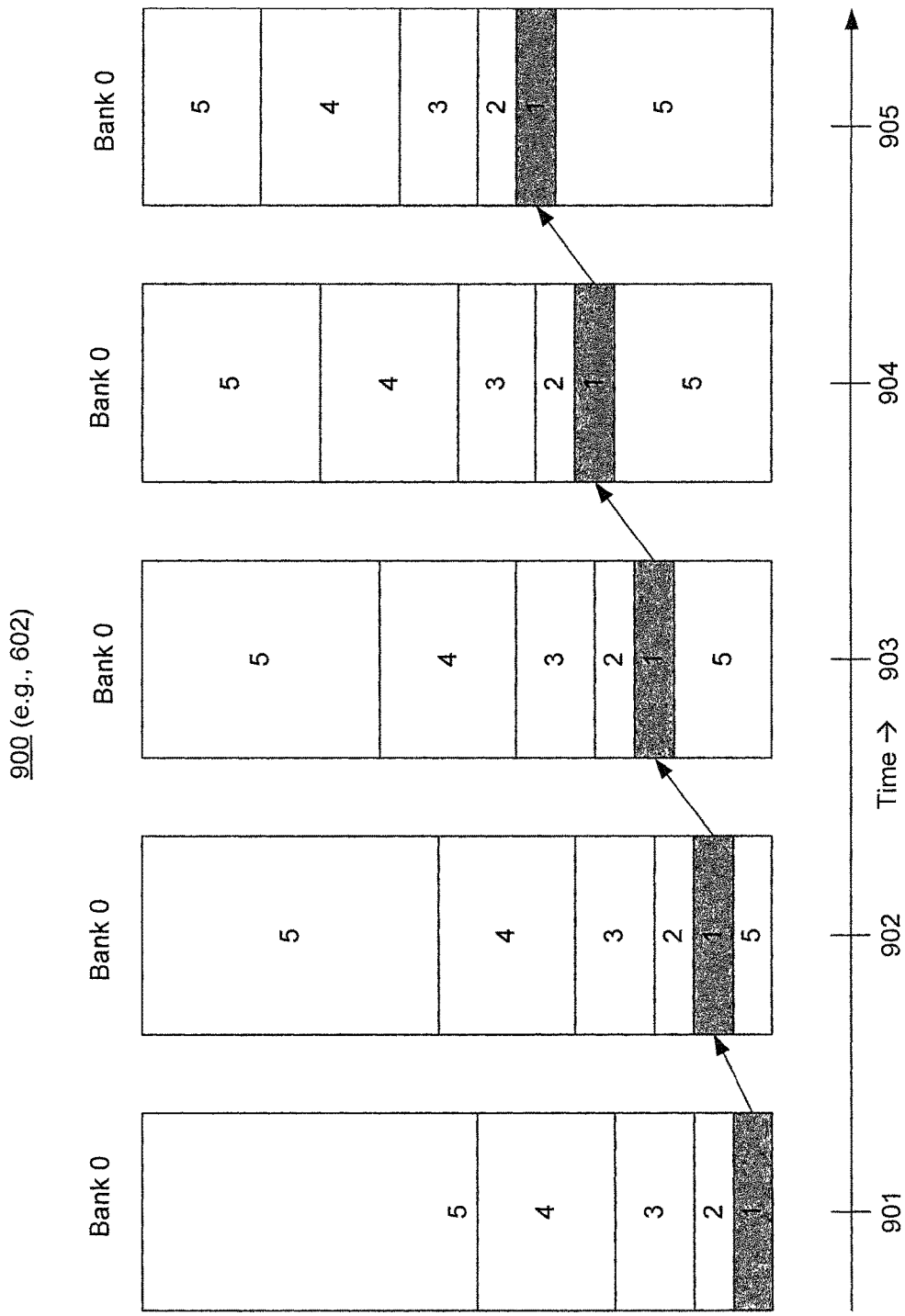
FIG. 9 illustrates a rotation scheme in which active power gates are rotated in a bank of power gates, according to one embodiment of the disclosure.

FIG. 9 illustrates a rotation scheme 900 in which active power gates are rotated in a bank of power gates, according to one embodiment of the disclosure. It is pointed out that those elements of FIG. 9 having the same reference numbers (or names) as the elements of any other figure can operate or function in any manner similar to that described, but are not limited to such.

As discussed with reference to FIG. 6, digital control code 612 is used to turn on or off power gate devices of power gate 602. Since the power gate devices are controlled by an on/off signal (instead of an analog bias signal), channel resistance of the power gate devices (e.g., MP1-MPN) is fixed for a given process corner. In one exemplary operating condition for DLDO VR 600, when low output voltage for gated power supply 613 is needed for a certain power state (e.g., when processor module is transitioning from turbo mode 202 to LFM 204), to create an IR drop across the power gate devices (e.g., MP1-MPN) to lower voltage of gated power supply 613, effective resistance of the power gate devices (e.g., MP1-MPN) is increased. In one embodiment, the effective resistance of power gate devices (e.g., MP1-MPN) is increased by reducing the number of power gate devices that are turned on.

Continuing with the above example, for a given load current (of load 603) as the target output voltage (i.e., gated power supply 613) is lowered, more current is pumped through a given power gate device which is turned on. There is a limit on the amount of current that can be pumped through a given via associated with the power gate device which is turned on. Exceeding that limit of current can cause reliability failures (e.g., electro-migration) due to self-heat of the devices.

For example, a process technology sets a limit of about 45 µA current per power gate device (e.g., MP1 of power gate 602). Assuming that nominal channel resistance of a power gate device (e.g., MP1) is about 500 Ωs, with the current limit of 45 µA current per power gate device, the maximum voltage drop across the power gate device without violating the reliability limit of 45 µA current per power gate device is about 22 mV. 22 mV is a very small voltage drop when IR drops of about 630 mV may be needed to generate gated power supply 613. To overcome this and other problems, active power gates are rotated in a bank of power gates.

Rotation scheme 900 shows how a set of active power gate devices (where active set comprises one or more power gates that are turned on) is rotated in time, according to one embodiment. Rotation scheme 900 shows five time points—901, 902, 903, 904, and 905. In one embodiment, power gate devices of power gate 602 are organized in banks. In one embodiment, power gate devices in each bank are grouped together in a weighted scheme. For example, in one embodiment, a binary weighted scheme is used. In another example, a thermometer weighted scheme is used.

In this example, five groups of binary weighted power gate devices are shown in bank 0. The five groups of binary weighted power gate devices are labeled 1 though 5. The shaded group '1' is the set of active power gate devices. In one embodiment, as time progresses from 901 to 902, a controller shifts the active set of power gate devices so that power gate devices that were previously off are now on so that the power gate devices age uniformly. In this embodiment, power gate devices that were turned on at time 901 are now tuned off in time 902 to avoid reliability issues. The process continues over time and set(s) of active power gates are rotated through the bank.

Figure 10:
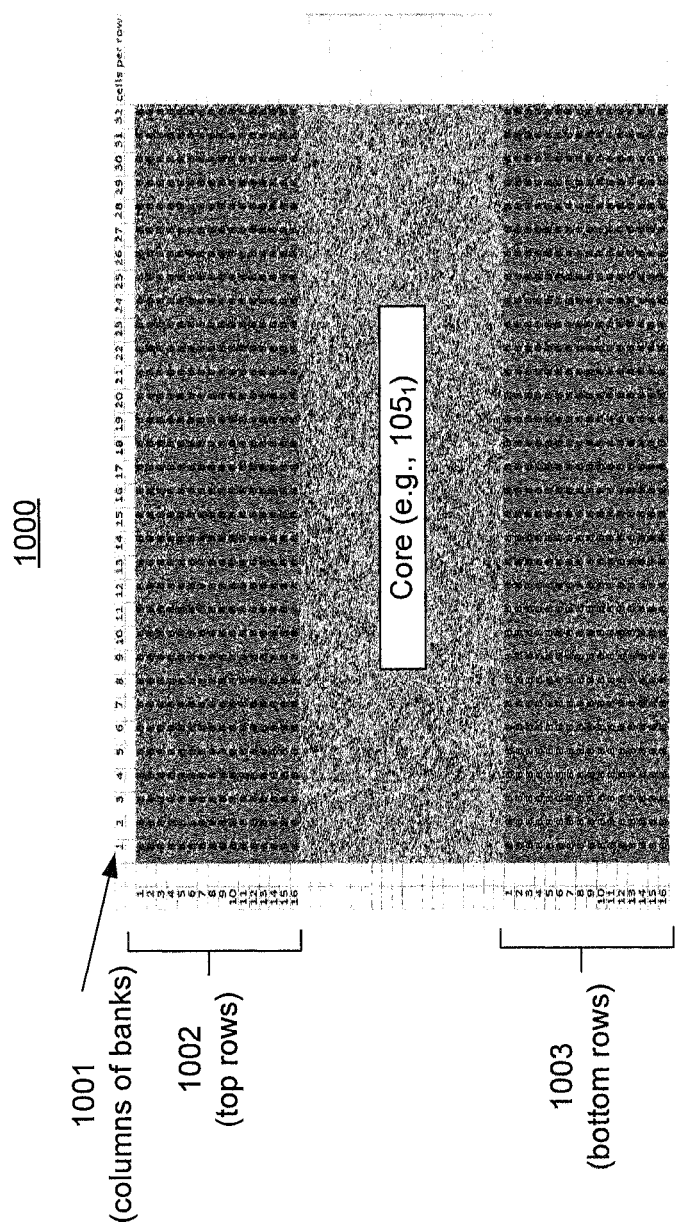
FIG. 10 shows a floor-plan for a processor core with power gate devices organized in banks, according to one embodiment of the disclosure.

FIG. 10 shows a floor-plan 1000 for a processor core (e.g., 105$_1$) with power gate devices organized in banks, according to one embodiment of the disclosure. It is pointed out that those elements of FIG. 10 having the same reference numbers (or names) as the elements of any other figure can operate or function in any manner similar to that described, but are not limited to such.

In one embodiment, each processor core (e.g., 105$_1$) is powered through a lumped set of power gate devices that are located on the top (e.g., 1002) and bottom (e.g., 1003) as a strip of transistors. In one embodiment, the set of power gate devices is made up of multiple banks, (e.g., 32) and they are spread out horizontally. In one embodiment, each bank is made up of rows (e.g., 16 rows each in 1002 and 1003) and each row within a bank has cells (e.g., 8 cells). In this exemplary embodiment, there are a total of 32×16×8=4096 cells in power gate 602 and 33 columns of banks 1001.

In one embodiment, output code from a controller is sent to all the banks. In one embodiment, a column decoder (not shown) also receives the output code, where the column decoder coupled to each bank decides which of the 16×8=128 cells in a bank need to be turned on. In one embodiment, controller is integrated in PCU 104. In other embodiments, controller is a separate logic unit. In one embodiment, controller is operable to be overridden by software (e.g., operating system) or hardware (e.g., fuses).

Continuing with the example, with 128 cells per bank, 7 bits of control are used for controlling all the cells in a bank. In this example of rotation of active sets of power gate devices, the 7 bits of code that is applied to each bank is shifted by one bit every clock cycle in a circular loop.

In one embodiment, for large dropout voltages when one or two rows in a bank are turned on, the controller ensures that every clock period a different power gate device is turned on to distribute the current stress over the entire bank over a 16 cycle window. This reduces the stress per row to 1/16 and enables successful implementation of digital control of power gate 602 without overheating the power gate device fins and causing failure.

Figure 11:
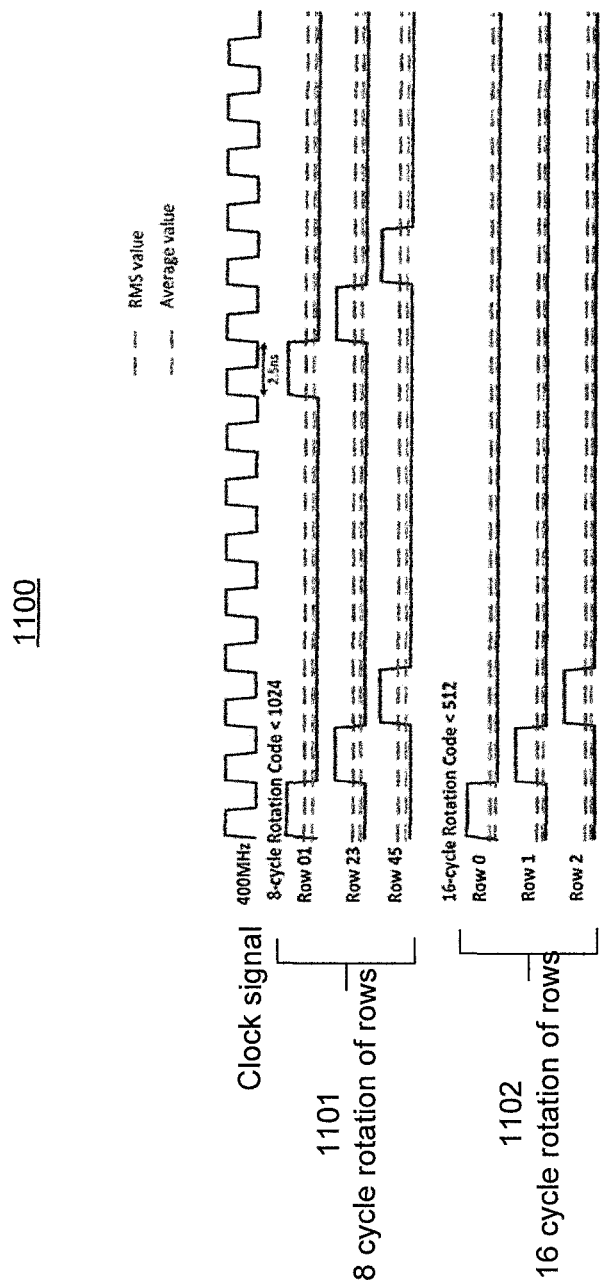
FIG. 11 is a timing diagram illustrating rotation of active power gates in a bank of power gates, according to one embodiment of the disclosure.

FIG. 11 is a timing diagram 1100 illustrating rotation of active power gates in a bank of power gates, according to one embodiment of the disclosure. It is pointed out that those elements of FIG. 11 having the same reference numbers (or names) as the elements of any other figure can operate or function in any manner similar to that described, but are not limited to such.

Since the power gates devices (e.g. 602) are programmed as on/off switches, for a given un-gated power supply voltage (e.g., 108) and gated power supply voltage (e.g., 601) the power gates devices provide a fixed channel resistance. In one embodiment, to achieve the target voltage for the gated power supply voltage, for large voltage difference between input (e.g., 108) and output nodes (e.g., 608), more and more current has to be channeled through a given power gate device channel (e.g., channel(s) of one or more of $MP_{1-N}$). The increase in current creates a reliability issue for the metal interconnects and the device channels that are carrying the current to the load 603. Timing diagram 1100 depicts a method used to reduce the average current in the power gate devices by employing a code rotation scheme. In one embodiment, the code rotation duty cycle is extended so as not to violate channel temperature and metal stress.

Timing diagram 1100 shows clocking and duty cycle of code rotation logic for an 8-clock and 16-clock code rotation. The first signal from the top is a clock signal. In one embodiment, a row of power gates are rotated every clock signal period. In this example, the clock signal is 400 MHz clock signal with a period of 2.5 ns. The second set of signals 1101 from the top indicates which rows of power gates are active for an 8 cycle rotation scheme. As shown, after 8 cycles of clock signal, rotation of an active row of power gates is complete. The second set of signals 1102 from the top indicates which rows of power gates are active for a 16 cycle rotation scheme. In this example, after 16 cycles of clock signal, rotation of an active row of power gates is complete.

Figure 12:
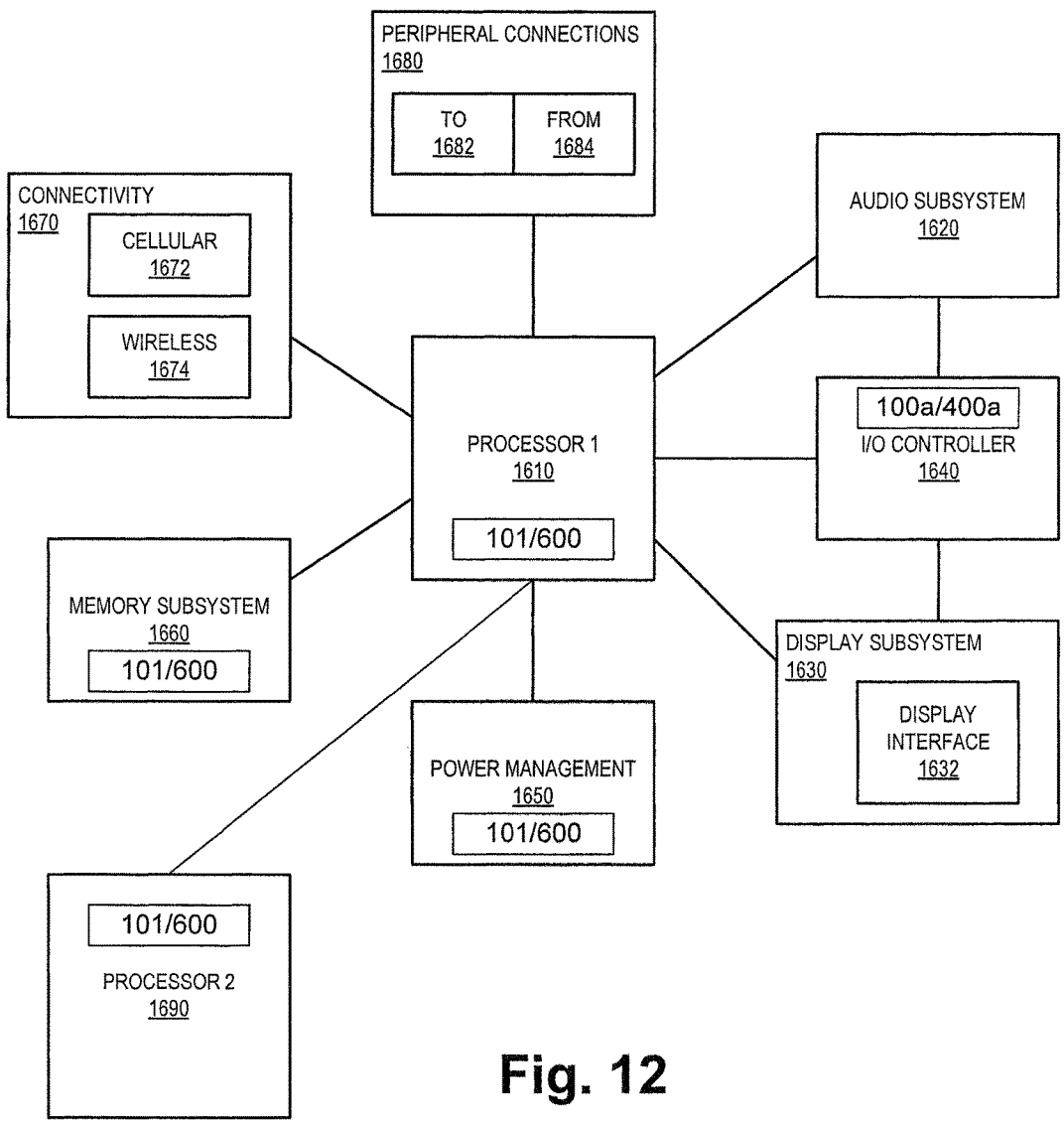
FIG. 12 is a smart device or a computer system or a SOC with the multiple VID power architecture, a DLDO VR, and/or apparatus for improving reliability of power gates, according to one embodiment of the disclosure.

FIG. 12 is a smart device or a computer system or an SOC with the multiple VID power architecture, a DLDO VR, and/or apparatus for improving reliability of power gates, according to one embodiment of the disclosure. FIG. 12 illustrates a block diagram of an embodiment of a mobile device in which flat surface interface connectors could be used. In one embodiment, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In one embodiment, computing device 1600 includes a first processor 1610 with a memory having multiple VID power architecture of FIG. 1, and a second processor 1690 with memory having multiple VID power architecture of FIG. 1, according to the embodiments discussed herein. Other blocks of the computing device 1600 with I/O drivers may also include multiple VID power architecture of FIG. 1. The various embodiments of the present disclosure may also comprise a network interface within 1670 such as a wireless interface so that a system embodiment may be incorporated into a wireless device, for example, cell phone or personal digital assistant.

In one embodiment, first processor 1610 includes DLDO VR 600 of FIG. 6. In one embodiment, second processor 1690 includes DLDO VR 600 of FIG. 6. Other blocks of the computing device may also include DLDO VR 600 of FIG. 6.

In one embodiment, first processor 1610 includes apparatus for improving reliability of power gates shown as an exemplary embodiment in FIG. 9. In one embodiment, second processor 1690 includes apparatus for improving reliability of power gates shown as an exemplary embodiment in FIG. 9. Other blocks of the computing device 1600 may also include apparatus for improving reliability of power gates shown as an exemplary embodiment in FIG. 9.

In one embodiment, processor 1610 can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In one embodiment, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In one embodiment, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, in one embodiment an apparatus comprises: a first processing core; a second processing core; and a power control unit (PCU) which is operable to: generate a first voltage identification signal (VID) for an off-die regulator external to the apparatus, the first VID resulting in a first power supply for the first processing core; and generate a second VID different from the first VID, the second VID resulting in a second power supply for the second processing core.

In one embodiment, the second power supply being lower than the first power supply. In one embodiment, the second processing core is operating at a lower power mode than the first processing core. In one embodiment, the second processing core comprises a low dropout (LDO) regulator to generate the second power supply in response to the second VID. In one embodiment, the LDO regulator is a digital LDO regulator.

In one embodiment, the first processing core has a digital low dropout (LDO) regulator which is operable to perform in a bypass mode to generate the first power supply. In one embodiment, the digital LDO of the first processing core operates in bypass mode by turning on substantially all power-gate devices to provide the first power supply to the first processing core. In one embodiment, the PCU is operable by an operating system.

In another example, a system comprises: a memory unit; a power module integrated circuit (PMIC); and a processor, coupled to the PMIC and the memory unit, the processor comprising: a first processing core; a second processing core; and a power control unit (PCU) which is operable to: generate a first voltage identification signal (VID) for the PMIC, the first VID resulting in a first power supply for the first processing core; and generate a second VID different from the first VID, the second VID resulting in a second power supply for the second processing core.

In one embodiment, the system further comprises: a wireless interface to allow the processor to communicate with another device; and a display unit. In one embodiment, the processor is according to the apparatus discussed above.

In another example, an apparatus comprises: a plurality of power-gate transistors controllable by a digital bus, the plurality of power-gate transistors operable to provide a first power supply to a processing core, and to receive a second power supply as input; an analog to digital converter (ADC) to receive the first power supply and to generate a digital output representative of the first power supply; and a controller to receive the digital output representative of the first power supply and to generate the digital bus for controlling the plurality of power-gate transistors.

In one embodiment, the apparatus further comprises a digital to analog converter (DAC) to convert a voltage identification signal (VID) into a plurality of analog signals for the ADC. In one embodiment, the VID is generated by a power control unit (PCU). In one embodiment, the apparatus further comprises a decoder to decode an output of the controller to generate the digital bus for controlling the plurality of power-gate transistors. In one embodiment, the decoder is operable to cause the apparatus to operate in bypass mode by turning on substantially all of the plurality of power gate transistors. In one embodiment, the decoder is operable to generate the digital signal to cause all the plurality of power gate transistors to turn off. In one embodiment, the controller comprises an integrator. In one embodiment, the controller is operable to compensate for pole associated with a node having the first power supply. In one embodiment, the plurality of power-gate transistors is p-type transistors.

In another example, a system comprises: a power module integrated circuit (PMIC) to provide a power supply; and a processor coupled to the PMIC, the processor comprising: a first processing core having a first digital low-dropout (LDO) regulator including: a plurality of power-gate transistors controllable by a digital bus, the plurality of power-gate transistors operable to provide a first power supply to a processing core, and to receive the power supply as input from the PMIC; an analog to digital converter (ADC) to receive the first power supply and to generate a digital output representative of the first power supply; and a controller to receive the digital output representative of the first power supply and to generate the digital bus for controlling the plurality of power-gate transistors.

In one embodiment, the first processing core according to apparatus discussed above. In one embodiment, the system further comprises a second processing core having a second digital LDO. In one embodiment, the processor comprises a power control unit (PCU) which is operable to generate a first voltage identification signal (VID) for the PMIC, the first VID resulting in the power supply for the first digital LDO. In one embodiment, the PCU is further operable to generate a second VID for the second digital LDO, the second VID being different from the first VID, the second VID resulting in a second power supply for the second processing core. In one embodiment, the first digital LDO is operable to operate in bypass mode by turning on substantially all of the plurality of power-gate transistors.

In one embodiment, the apparatus comprises a plurality of rows of power gate transistors; and a controller to control the power gate transistors in each row in the plurality of rows, wherein the controller is operable to rotate over time an active row of power gates such that the total active power gates is the same during rotation. In one embodiment, the apparatus further comprises a plurality of banks, wherein each bank includes a plurality of rows of power gate transistors. In one embodiment, the apparatus further comprises a column decoder to determine which rows of power gate transistors in each bank is to be turned on or off.

In one embodiment, the controller is operable to control the column decoder. In one embodiment, the controller is operable to rotate over time an active row of power gates every clock cycle. In one embodiment, the plurality of rows of power gate transistors is organized in a binary weighted scheme. In one embodiment, the plurality of rows of power gate transistors is organized in a thermometer weighted scheme.

In another example, a system comprises: a power module integrated circuit (PMIC) to provide a power supply; and a processor coupled to the PMIC, the processor comprising: a first processing core having a power module according to the apparatus discussed above. In one embodiment, the plurality of power-gate transistors are controllable by a digital bus, the plurality of power-gate transistors operable to provide a first power supply to a processing core, and to receive the power supply as input from the PMIC.

In one embodiment, the power module further comprises: an analog to digital converter (ADC) to receive the first power supply and to generate a digital output representative of the first power supply; and a controller to receive the plurality of power-gate transistors of the first power supply and to generate the digital bus for controlling the plurality of power-gate transistors.

In one embodiment, the system further comprises: a wireless interface for allowing the processor to communicate with other devices. In one embodiment, the system further comprises a memory unit coupled to the processor. In one embodiment, the system further comprises a display unit.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
   a plurality of power-gate transistors controllable by a digital bus, the plurality of power-gate transistors to provide a first power supply to a processor core, and to receive a second power supply as input;
   an analog to digital converter (ADC) to receive the first power supply and to selectively generate a digital output representative of the first power supply; and
   a controller to receive the digital output representative of the first power supply and to generate the digital bus to control the plurality of power-gate transistors.

2. The apparatus of claim 1, further comprising:
   a digital to analog converter (DAC) to convert a voltage identification signal (VID) into a plurality of analog signals for the ADC.

3. The apparatus of claim 1, wherein the VID is generated by a power control unit (PCU).

4. The apparatus of claim 1, further comprising:
   a decoder to decode an output of the controller to generate signals for the digital bus to control the plurality of power-gate transistors.

5. The apparatus of claim 4, wherein the decoder is to cause the apparatus to operate in a bypass mode, wherein all of the plurality of power gate transistors are substantially turned on in the bypass mode.

6. The apparatus of claim 4, wherein the decoder is to generate the signals for the digital bus to cause all the plurality of power gate transistors to turn off.

7. The apparatus of claim 1, wherein the controller comprises an integrator.

8. The apparatus of claim 1, wherein the controller is to compensate for pole associated with a node having the first power supply.

9. The apparatus of claim 1, wherein the plurality of power-gate transistors comprise p-type transistors.

10. The apparatus of claim 1, further comprising:
    a digital to analog converter (DAC) to receive a voltage identification signal (VID), and to convert the VID into a plurality of analog signals for the ADC,
    wherein for a first value of the VID, the controller is to generate the digital bus such that the apparatus is to operate in a bypass mode.

11. The apparatus of claim 10, wherein:
    the controller is to generate signals for the digital bus such that, while the apparatus is to operate in the bypass mode, substantially all of the plurality of power gate transistors are to be turned on.

12. The apparatus of claim 10, wherein:
    the controller is to generate the digital bus such that, while the apparatus is to operate in the bypass mode, the second power supply is substantially output as the first power supply by the apparatus.

13. The apparatus of claim 10, wherein:
    the ADC is to refrain from generation of the digital output representative of the first power supply, while the apparatus is to operate in the bypass mode.

14. A system comprising:
    a processor core;
    a voltage regulator to provide a first power supply to the processor core, the voltage regulator comprising:
      a plurality of power-gate transistors controllable by a digital bus, the plurality of power-gate transistors to provide the first supply to the processor core,
      an analog to digital converter (ADC) to receive the first power supply, and to generate a digital output representative of the first power supply, and
      a controller to receive the digital output representative of the first power supply, and to generate the digital bus to control the plurality of power-gate transistor; and a wireless interface to allow the processor core to communicate with another device.

15. The system of claim 14, wherein the voltage regulator is included within the processor core.

16. The system of claim 14, wherein:
the voltage regulator is to receive a voltage identification signal (VID), to receive a second power supply, and to generate the generate the first power supply from the second power supply responsive to the VID; and
for a first value of the VID, the voltage regulator is to operate in a bypass mode such that substantially all of the plurality of power gate transistors are to be turned on.

17. The system of claim 16, wherein:
for the first value of the VID, the voltage regulator is to operate in the bypass mode such the voltage regulator is to refrain from regulation of the first power supply.

18. An apparatus comprising:
a plurality of power-gate transistors controllable by a digital bus, the plurality of power-gate transistors operable to provide a first power supply to a processor core, and to receive a second power supply as input; and
a controller to generate the digital bus to control the plurality of power-gate transistors,
wherein in a bypass mode of operation, the controller is to refrain from regulation of the first power supply, wherein the controller is to turn on substantially all of the plurality of power gate transistors in the bypass mode.

19. The apparatus of claim 18, further comprising:
an analog to digital converter (ADC) to receive the first power supply, to selectively generate a digital output representative of the first power supply, and to selectively provide the digital output representative of the first power supply to the controller,
wherein during the bypass mode of operation, the ADC is to refrain from provision of the digital output representative of the first power supply to the controller.

20. The apparatus of claim 18, wherein:
the ADC is to receive a voltage identification signal (VID),
wherein in response to the VID indicating the bypass mode of operation, the ADC is to refrain from provision of the digital output representative of the first power supply to the controller.

* * * * *